US009112847B2

(12) United States Patent
Nandakumar

(10) Patent No.: US 9,112,847 B2
(45) Date of Patent: *Aug. 18, 2015

(54) AUTHENTICATION METHOD

(71) Applicant: Textile Computer Systems, Inc., San Antonio, TX (US)

(72) Inventor: Gopal Nandakumar, San Antonio, TX (US)

(73) Assignee: Textile Computer Systems, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,342

(22) Filed: Apr. 17, 2014

(65) Prior Publication Data

US 2014/0230036 A1 Aug. 14, 2014

Related U.S. Application Data

(63) Continuation of application No. 13/279,294, filed on Oct. 23, 2011, now Pat. No. 8,713,656.

(51) Int. Cl.
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |

(Continued)

(52) U.S. Cl.
CPC ............ H04L 63/08 (2013.01); G06Q 20/3823 (2013.01); G06Q 20/40 (2013.01); H04L 9/321 (2013.01); H04L 9/3271 (2013.01); H04L 2209/56 (2013.01)

(58) Field of Classification Search
CPC ....... H04L 63/08; H04L 63/083; H04L 63/10; H04W 12/06; G06F 21/31
USPC ............................................................ 726/7
See application file for complete search history.

(56) References Cited

U.S. PATENT DOCUMENTS

| 7,552,467 B2 * | 6/2009 | Lindsay ............................. 726/5 |
| 2003/0200184 A1 | 10/2003 | Dominguez et al. |
| 2004/0044621 A1 | 3/2004 | Huang et al. |

(Continued)

OTHER PUBLICATIONS

Potratz, Daniel B., Office Action, Feb. 27, 2013, U.S. Appl. No. 13/279,287, U.S.

(Continued)

*Primary Examiner* — Kambiz Zand
*Assistant Examiner* — Stephen Sanders
(74) *Attorney, Agent, or Firm* — Gunn, Lee & Cave, P.C.

(57) ABSTRACT

A system and method whereby the identity of a person, entity, device or the like attempting to gain access to a secured resource may be securely authenticated includes a means for receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; a means for generating and communicating to the purported authorized user a challenge string adapted to provide a basis for authenticating the identity of the requester; a means for receiving a response string corresponding to the challenge string; and a means for evaluating the response string to authenticate the identity of the requester.

9 Claims, 16 Drawing Sheets

(51) Int. Cl.
*G06Q 20/38* (2012.01)
*G06Q 20/40* (2012.01)

(56) References Cited

U.S. PATENT DOCUMENTS

| | | | |
|---|---|---|---|
| 2004/0059688 A1 | 3/2004 | Dominguez et al. | |
| 2004/0255137 A1* | 12/2004 | Ying | 713/193 |
| 2005/0246278 A1 | 11/2005 | Gerber et al. | |
| 2006/0020783 A1* | 1/2006 | Fisher | 713/156 |
| 2007/0250920 A1* | 10/2007 | Lindsay | 726/7 |
| 2008/0034219 A1* | 2/2008 | Ting | 713/186 |
| 2008/0091602 A1 | 4/2008 | Gray et al. | |
| 2009/0063345 A1 | 3/2009 | Erikson | |
| 2009/0076966 A1 | 3/2009 | Bishop et al. | |
| 2009/0100270 A1* | 4/2009 | Ting | 713/186 |
| 2009/0157518 A1 | 6/2009 | Bishop et al. | |
| 2009/0164373 A1 | 6/2009 | Blythe | |
| 2009/0258588 A1* | 10/2009 | Hsu et al. | 451/527 |
| 2009/0313168 A1 | 12/2009 | Manessis | |
| 2010/0174626 A1 | 7/2010 | Stringfellow et al. | |
| 2011/0125638 A1 | 5/2011 | Davis et al. | |
| 2012/0011065 A1 | 1/2012 | Winfield-Chislett et al. | |
| 2012/0018506 A1 | 1/2012 | Hammad et al. | |
| 2012/0030066 A1 | 2/2012 | Stringfellow et al. | |
| 2012/0066129 A1 | 3/2012 | Dominguez et al. | |
| 2012/0066130 A1 | 3/2012 | Dominguez et al. | |
| 2012/0239565 A1 | 9/2012 | Davis et al. | |
| 2013/0036058 A1 | 2/2013 | Kelly et al. | |
| 2014/0046746 A1 | 2/2014 | Davis et al. | |

OTHER PUBLICATIONS

Potratz, Daniel B., Office Action, Jul. 26, 2013, U.S. Appl. No. 13/279,287, U.S.
West, Thomas C., Office Action, Mar. 1, 2012, U.S. Appl. No. 13/279,288, U.S.
West, Thomas C., Office Action, Oct. 7, 2013, U.S. Appl. No. 13/279,288, U.S.
Sanders, Stephen, Office Action, Dec. 14, 2012, U.S. Appl. No. 13/279,289, U.S.
Elmore, John E., Office Action, Oct. 23, 2013, U.S. Appl. No. 13/279,290, U.S.
Elmore, John E., Office Action, Mar. 28, 2013, U.S. Appl. No. 13/279,290, U.S.
Sanders, Stephen, Office Action, Jan. 2, 2013, U.S. Appl. No. 13/279,290, U.S.
Sanders, Stephen, Office Action, Jan. 2, 2013, U.S. Appl. No. 13/279,293, U.S.
Sanders, Stephen, Office Action, Jan. 2, 2013, U.S. Appl. No. 13/279,294, U.S.
Sanders, Stephen, Office Action, Jun. 19, 2013, U.S. Appl. No. 13/279,294, U.S.
Sanders, Stephen, Office Action, Oct. 18, 2013, U.S. Appl. No. 13/279,294, U.S.
Elmore, John, E., Office Action, Apr. 3, 2013, U.S. Appl. No. 13/279,295, U.S.
Le, Khoi, V., Office Action, May 12, 2012, U.S. Appl. No. 13/279,296, U.S.
Le, Khoi, V., Office Action, May 22, 2013, U.S. Appl. No. 13/279,296, U.S.
Le, Khoi, V., Office Action, Aug. 14, 2013, U.S. Appl. No. 13/279,296, U.S.
Le, Khoi, V., Office Action, Sep. 6, 2013, U.S. Appl. No. 13/279,296, U.S.
Elmore, John, E., Office Action, Apr. 3, 2013, U.S. Appl. No. 13/279,297, U.S.
Elmore, John, E., Office Action, Oct. 22, 2013, U.S. Appl. No. 13/279,297, U.S.
Linder, Nora, "Notification Concerning Transmittal of International Preliminary Report on Patentability (Chapter 1 of the Patent Cooperation Treaty),"dated May 8, 2014, Applicant Name: Gopal Nandakumar, International Application No. PCT/US2012/059724; International Filing Date Oct. 11, 2012, claiming priority date to Oct. 23, 2011, U.S.
Mastercard, "MasterCard SecureCode; Merchant Implementation Guide"; Nov. 9, 2011.
Visa, "Verfied by Visa; Acquirer and Merchant Implementation Guide; U.S. Region"; May 2011.
www.creditcards.com/credit-card-new/tokenization-to-fight-credit-card-id-theft-1282.php.
The Data Protection Company, "SafeNet Tokenization Manager Product Brief", published 2011 in the U.S.
Horton,Tim, and McMillon, Robert, "A Primer on Payment Security Technologies: Encryption and Tokenization," published 2011 in the U.S.
Dragt, Bruce and McMillon, Robert, "Implementing Tokenization is Simpler Than you Think," published 2010 in the U.S.
Scoping Sig, Tokenization Taskfoce PCI Security Standards Council, PC Data Security Standard (PCI DSS), Version 2, published Aug. 2011, in the U.S.
Sommers, Steven M., "Tokenization in Depth, A Detailed Look at Tokenization and its Advantages over Encryption," by Shift4 Secure Payment Process.
Visa, "Visa Best Practices for Tokenization Version 1.0," published Jul. 14, 2010.

\* cited by examiner

AUTHENTICATION METHOD

CROSS-REFERENCES TO RELATED APPLICATIONS

This continuation application claims priority to and the benefit of U.S. application Ser. No. 13/279,294, filed Oct. 23, 2011, which is incorporated by reference herein.

STATEMENT REGARDING FEDERALLY SPONSORED RESEARCH OR DEVELOPMENT

Not applicable.

FIELD OF THE INVENTION

The present invention relates to security protocols for use in securing and/or restricting access to personal other confidential information, physical locations and the like. More particularly, the invention relates to a method whereby the identity of a person, entity, device or the like attempting to gain access to a secured resource may be securely authenticated.

BACKGROUND OF THE INVENTION

The protection of personal information and/or other secured resources, such as, for example, credit data, medical history, financial account information, secured physical locations and the like is of ever increasing concern to businesses and individuals alike. To be sure, each passing day reveals more sophisticated attacks by those who would gain unauthorized access to such resources absent the constant vigilance of those charged with the protection of such resources. To this end, the various security protocols employed for the protection of such resources almost universally includes some means for authenticating the identity of a person, entity, device or the like attempting to gain access to a secured resource.

More often than not the critical authentication is carried out by the age old process of a providing a privately held password, personal identification number or the like in connection with some generally publicly known identifier for the person, entity, device or the like attempting to gain access to the secured resource. Unfortunately, however, this protocol is dogged by vulnerability to interception through spoofing, eavesdropping, and countless other techniques though which a password, personal identification number or the like may become known to an attacker. Additionally, it is common to find that a single person, entity, device or the like uses the same password, personal identification number or the like in connection with gaining access to multiple secured resources. In such case, a security breach in connection with a single secured resource may jeopardize the security of all other secured resources.

Giving the fundamentally flawed state of the art with respect to password type protection, it is therefore the overriding object of the present invention to improve over the prior art by providing a method by which authentication may be more securely conducted. Additionally, it is an object of the present invention to provide such a method that is robust in specific implementation and readily usable by any manner of person, entity, device or the like. Finally, it is an object of the present invention to provide such a method that is economical in implementation and therefore readily accessible to virtually any application.

SUMMARY OF THE INVENTION

In accordance with the foregoing objects, the present invention—a method for authenticating the identity of a requester of access to a secured resource—generally comprises the steps of receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; generating and communicating to the purported authorized user a challenge string adapted to provide a basis for authenticating the identity of the requester; receiving a response string corresponding to the challenge string; and evaluating the response string to authenticate the identity of the requester.

In at least some implementations of the present invention, the authentication method further comprises the step of determining from among a plurality of secured resources associated with the authorized user the identity of a single secured resource for which the requester desires access.

In at least some implementations of the present invention, the authentication method further comprises the step of conducting for the benefit of the unauthorized user a transaction reliant upon access to the secured resource for which the requester desires access.

In at least some implementations of the present invention, the authentication method further comprises the step of determining whether the response string should, as a result of passage of time and regardless of content, be deemed to be invalid.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 9 shows, in an elevational representation, a representative terminal device such as may be provided in connection with a service client implementing functionality of the present invention and showing, in particular, representative means for identifying the service client as well as means for communicating an authentication credential to the service client as implemented in connection with a point-of-sale, fueling station, automatic teller machine or like terminal device;

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
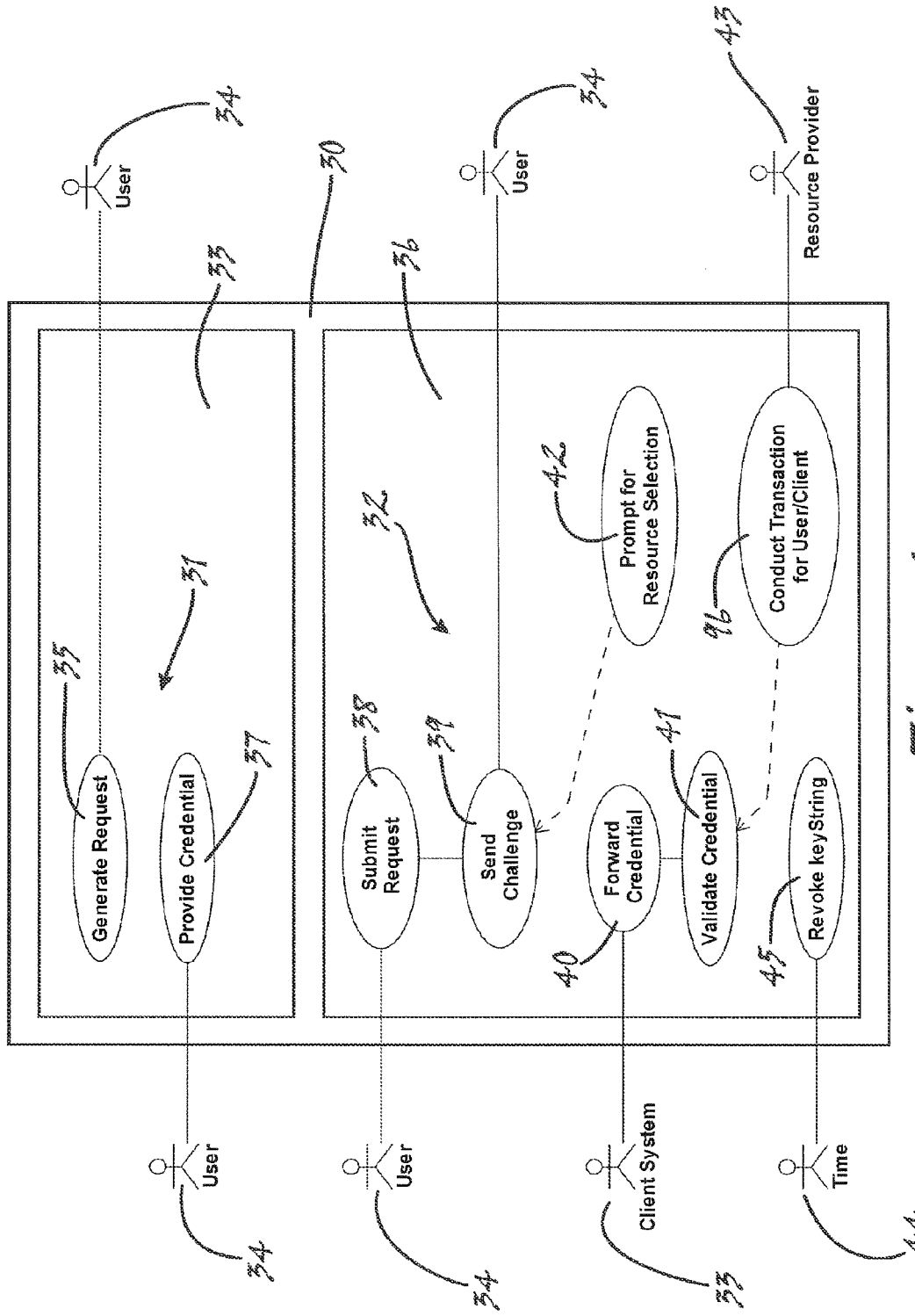
FIG. 1 shows, in an overview use case diagram, the various basic functionality implemented in the preferred embodiment of the authentication system and method of the present invention.

Referring now to the figures, and to FIG. 1 in particular, the authentication system 30 of the present invention is shown to generally comprise an operative combination of a plurality of service client implemented use cases 31 and a plurality of service provider implemented use cases 32. In particular, the service client 33 of the present invention will generally provide for an end user actor 34 a means 35 for identifying the service client 33 to a service provider 36 for the purpose of requesting that the service provider 36 provide for the service client 33 access to a secured resource. Additionally, the service client 33 of the present invention will generally provide for an end user actor 34 a means 37 for submitting an authentication credential to the service client 33 for use by the service client 33 in obtaining from the service provider 36 access to the requested secured resource.

As also particularly shown in FIG. 1, the service provider 36 of the present invention will generally provide for an end user actor 34 a means 38 for requesting that access to a secured resource be provided by the service provider 36 for a service client 33. Additionally, the service provider 36 of the present invention will generally provide responsive to the submission by an end user actor 34 of a request for access to a secured resource a means 39 for generating and sending to the end user actor 34 a challenge message 94 designed to enable only the intended end user actor 34 to determine the content of a transient authentication credential. Further, the service provider 36 of the present invention will generally provide for a service client actor 33 a means 40 for forwarding an end user provided authentication credential to the service provider 36. Still further, the service provider 36 of the present invention will generally provide responsive to the forwarding by a service client actor 33 of an authentication credential a means 41 for validating the authentication credential.

In an extension of the present invention particularly useful in implementations wherein the service provider 36 may not otherwise be readily able to determine the identity of a resource to which an end user actor 34 requests access based on the information content of the request as initially submitted by the end user actor 34 to the service provider 36, the service provider 36 may in combination with the means 38 for requesting access to a secured resource also be adapted to provide a means for determining a particular resource for access on the authority of the end user actor 34 such as, for example, a means 42 for prompting the end user actor 34 to provide additional identifying information for the requested resource.

In a further extension of the present invention particularly useful in the most typical implementations of the present invention wherein for security or other reasons the service client 33 is unable to directly access features or functionality of a resource for which an end user actor 34 has requested access, the service provider 36 is also adapted to provide for the end user actor 34 and/or the service client actor 33 a means 96 for conducting a transaction reliant upon or otherwise in connection with the requested secured resource. In this case, it is noted that the secured resource may be provided by and/or otherwise under the further control of a resource provider actor 43 external to the service provider 36 or, in the alternative, may be provided and/or implemented by and/or otherwise under the control of the service provider 36. In any event, the means 96 for conducting a transaction reliant upon or otherwise in connection with the requested secured resource may generally also further comprise a means for reporting the conducted transaction to the service client actor 33 and/or the end user actor 34.

Finally, it is noted that time 44 as an actor may be accommodated as desired in any particular implementation wherein the service provider 36 is also provided with a means 45 responsive to the passage of time for revoking or otherwise invalidating an authentication credential such that an authentication credential otherwise correctly determined by an end user actor 34 in response to a service provider generated challenge message 94 may as a result of the passage of time be deemed to be incorrect, thereby resulting in a validation failure upon application of the means 41 for validating the authentication credential.

Figure 2:
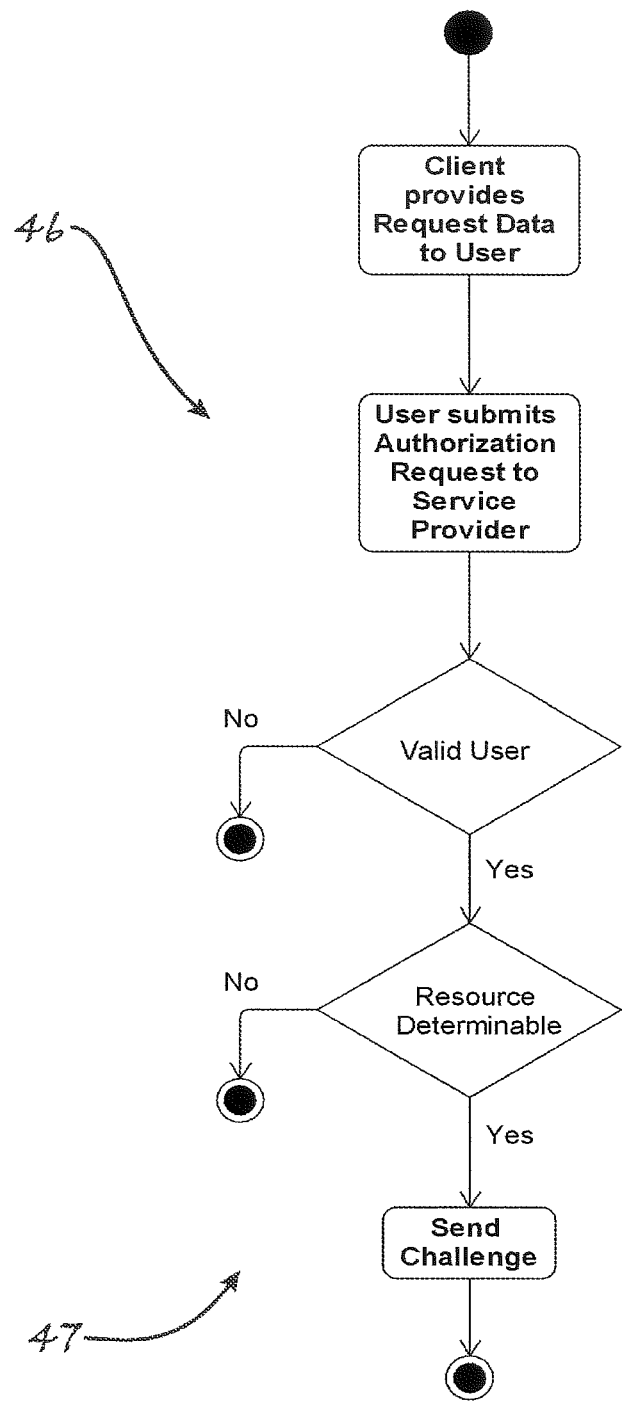
FIG. 2 shows, in a flowchart, an overview of the various steps generally taken in making a request for access to a secured resource in accordance with the present invention.
Figure 3:
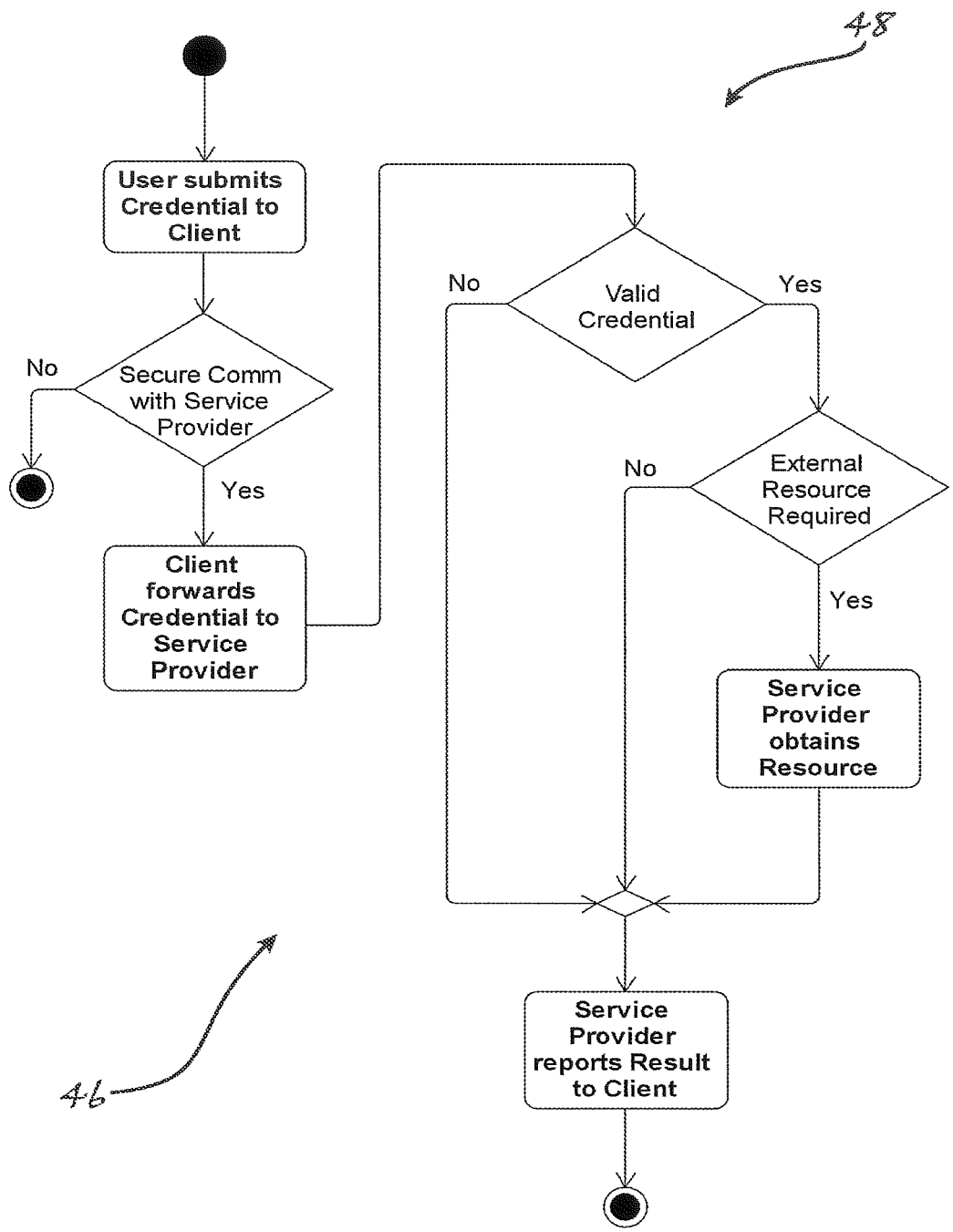
FIG. 3 shows, in a flowchart, an overview of the various steps generally taken in validating the purported access right of a user requesting access to a secured resource in accordance with the present invention.
Figure 4:
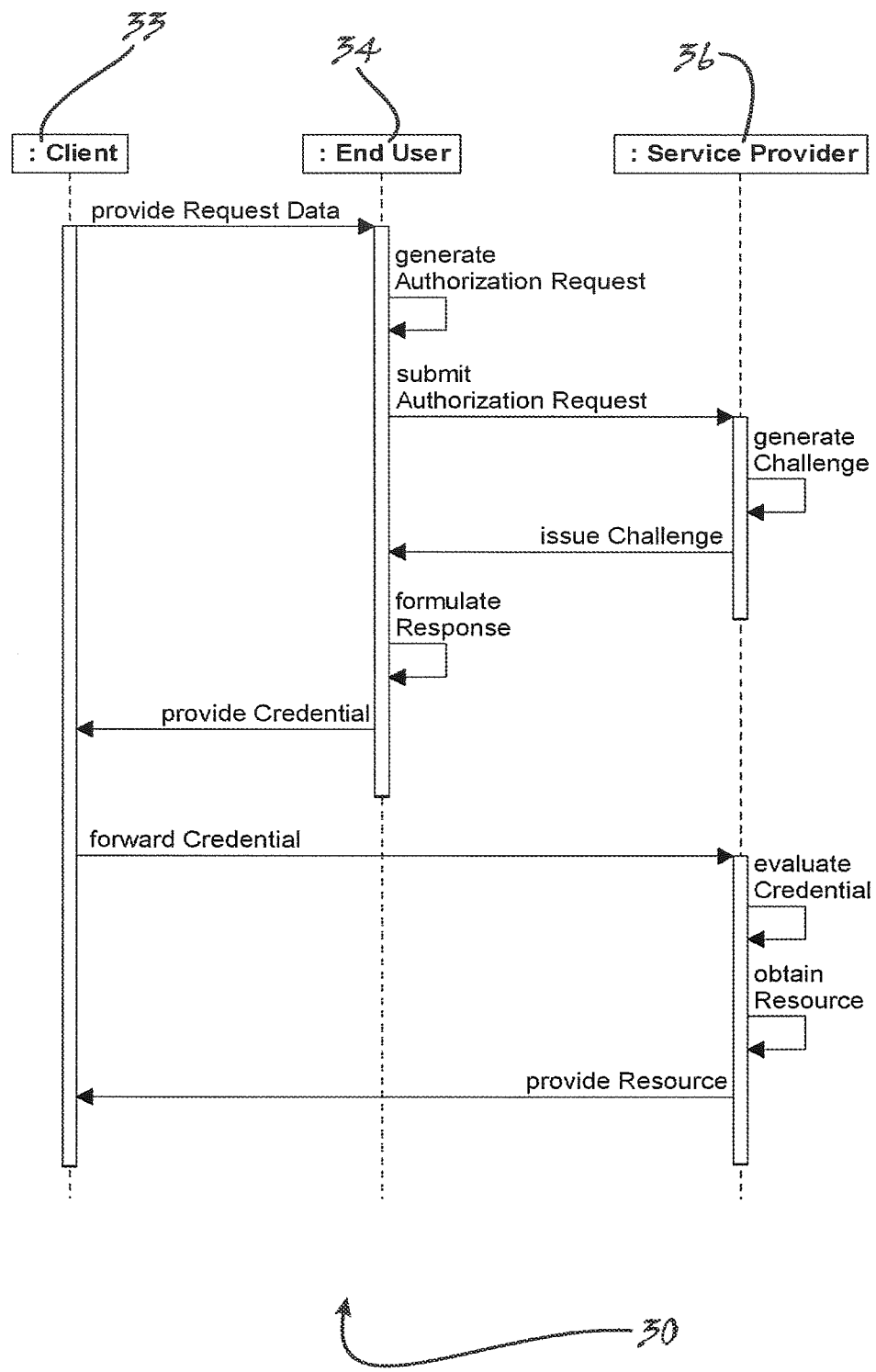
FIG. 4 shows, in an overview sequence diagram, various interactions as generally take place during the operation of the authentication system and method of the present invention.

Referring now then to FIGS. 2 through 4 in particular, the authentication method 46 of the present invention as operative upon the described authentication system 30 is shown to generally comprise various series of interactions between a user 34, a service client system 33 and a service provider system 36, as broadly set out in FIG. 4, wherein the interactions may be broadly categorized as steps 47 implicated in requesting access to a secured resource, as broadly set out in FIG. 2, and steps 48 implicated in validating the purported access right of the user requesting access to the secured resource, as broadly set out in FIG. 3.

As particularly shown in FIGS. 2 and 4, the authentication method 46 of the present invention generally begins with an end user 34 obtaining from a service client 33 data or other information necessary for the end user 34 to request that a service provider 36 provide for the service client 33 access to a secured resource. This data or other information will generally comprise the identification of the service client 33, but may additionally comprise any other data or information as may be helpful for the conduct of a particular transaction such as, for example, a purchase amount 76, a client reference, detailed or itemized transaction data or the like. In any case, the service client provided information is then utilized by the end user 34 to submit a request message 84 to the service provider 36 for the service provider 36 to provide for the service client 33 access to a secured resource.

Once a submitted request message 84 is received by the service provider 36, the service provider 36 preferably determines whether the end user 34 making the request is authorized or otherwise permitted to make such use of the authentication system 30. If in an implementation of this feature it is determined that the end user 34 is not authorized or otherwise permitted to make the attempted use of the authentication system 30 the process 47 will generally terminate whereas if it is determined that the end user 34 is authorized or otherwise permitted to make the attempted use of the authentication system 30 the process 47 will generally continue. Continuing in an important step, the service provider 36 must be able to evaluate the request message 84 to determine the specific identity of the resource for which the request is made. Because, in at least some implementations of the present invention, the common identifier for the resource will for security reasons not be allowed to be openly transmitted as part of submitted request, this step will in such implementations involve determining the identity of the resource from some element or combination of elements of information other than the common identifier for the resource. In any case, if the available and/or obtainable information is insufficient for the service provider 36 to positively determine the identity of the resource for which the end user 34 has requested access the process 47 will generally terminate whereas if the available and/or obtainable information is sufficient for the service provider 36 to positively determine the identity of the resource for which the end user 34 has requested access the process 47 will generally continue.

In the final steps for processing a request for access to a secured resource, the service provider 36 generates a challenge message 94 designed to enable the end user 34 to determine the content of a transient authentication credential and, thereafter, issues the challenge message 94 to the end user 34. With the challenge message 94 issued by the service provider 36 to the end user 34, the end user 34 then formulates a response to the challenge message 94 based upon information generally known only to the end user 34 and the service provider 36 and which, in no case, is ever known by or communicated to or through the service client 33. Once the end user 34 has formulated a response to the challenge message 94, and assuming that the end user 34 desires to continue the in-process transaction 46, the end user 34 will then submit the formulated response to the service client 33 as an authentication credential.

Referring now then to FIGS. 3 and 4 in particular, validation 48 of the purported access right of the user requesting access to a secured resource is shown to generally begin with the submission to a service client 33 by the end user 34 of an authentication credential, which authentication credential has been previously formulated by the end user 34 in response to issuance in connection with the transaction in progress by the service provider 36 of a challenge message 94. Once submitted by an end user 34 to a service client 33, an authentication credential must in order for the validation 48 to continue be forwarded by the service client 33 to the service provider 36. In an optional feature of the present invention, however, the service client 33 may be programmed or otherwise configured to ensure prior to forwarding the authentication credential to the service provider 36 that a secure communication channel is first established between the service client 33 and the service provider 36. If in an implementation of this feature the required secure communication channel cannot be established between the service client 33 and the service provider 36 the continuing process 48 will generally terminate whereas if the required secure communication channel is successfully established between the service client 33 and the service provider 36 the process 48 will generally continue.

Upon successful forwarding by the service client 33 to the service provider 36 of the end user submitted authentication credential, the service provider 36 proceeds to validate the responsive authentication credential by comparing the credential against a key string. As will be appreciated by those of ordinary skill in the art in light of this exemplary description, the key string will prior to or at the time of validation 48 be determined by the service provider 36 utilizing knowledge of the previously discussed information generally known only to the end user 34 and the service provider 36 to formulate the key string as the known correct response to the previously issued challenge message 94. In addition to comparison of the authentication credential to a known key string, however, it is noted that in an authentication system utilizing time 44 as an actor in order to provide a timeout for the validity of an outstanding challenge message 94, the service provider 36 will be programmed or otherwise adapted to determine as part of the validation step whether as a result of the passage of time 44 the authentication credential should be deemed to be incorrect. In any case, if the authentication credential is found or otherwise deemed to be incorrect, the service provider 36 will preferably report the incorrect finding to the service client 33 and/or the end user 34 and the process 48 will generally terminate whereas if the authentication credential is found to be correct the process 48 will generally continue.

With the authentication credential found to be correct, the service provider 36 may simply report the correct finding to the service client 33 or, if for security or other reasons the service client 33 is unable to directly access features or functionality of a resource for which an end user actor 34 has requested access, the service provider 36 will then obtain for the end user 34 and/or the service client 33 the benefit of the requested secured resource and thereafter appropriately report the conducted transaction to the service client 33 and/or the end user 34.

With the foregoing broad overview of the general structure and function of the authentication system 30 of the present invention in mind, it is now noted that in accordance with the present invention an end user 34 may comprise any person or machine requiring, in connection with some other use, access or other relationship with a service client 33, access for the service client 33 to a secured resource for which the service client 33 is restricted from full knowledge and for which the service provider 36 may hold full knowledge, full knowledge being defined herein as knowledge sufficient to make ordinary full use of the secured resource outside of the framework of the authentication system 30 and method 46 of the present invention. By way of simple example, the resource may comprise password protected information (e.g., a credit report) a portion of which (e.g., only the credit scores) a human end user 34 wishes to share with a service client 33 comprising an information consumer (e.g., a potential creditor) without providing to the information consumer the password (e.g., by which the full credit report is protected and as would otherwise enable the potential creditor to gain full access to the protected credit file). Under the present invention, a service provider 36 having associated therewith a hardware and/or software implementation of the previously generally discussed functionality is in accordance with the present invention programmed or otherwise adapted to receive directly from the service client 33 an end user provided authentication credential associated with a request by the end user 34 for the service provider 36 to provide for the service client 33 access to a secured resource and, thereafter, to validate the authentication credential from the service client 33 to ensure that the request is made under the authorization of an end user 34 having right of access to the secured resource. In a critical aspect of all implementations of the present invention, the actual information held by the end user 34 through which the service provider 36 is capable of authenticating the access right of the end user 34 is strictly withheld from the service client 33.

With this in mind, the end user 34 may, for example and without limitation, be a patient wishing to share medical information (a secured resource) with a healthcare or medical insurance provider (a service client 33) without having to grant to the healthcare or medical insurance provider unfettered access to all of his or her medical records; the end user 34 may be the holder of a credit card account, banking account, automated teller machine ("ATM") card and/or account or the like (a secured resource) wishing to purchase merchandise, services, information or the like from a retail store, service station, on-line service provider or merchandiser, other business or the like (a service client 33) without providing the service client 33 with his or her full credit card information, e.g. without providing his or her Card Verification ("CV") code, banking account information, personal identification number ("PIN") associated with the ATM card or the like; or a credit applicant or other holder of an information product wishing to share a credit score or other information (a secured resource) with a consumer of information products, such as an automobile dealership in need of consumer credit data or the like (a service client 33) without providing his or her Social Security Number or other information not necessary to the conduct of the present transaction.

In an additional critical aspect of the authentication system 30 and method 46 of the present invention, an additional security measure is implemented by requiring that the service client 33 be restricted also from access to the common identifier for the secured resource, e.g. the account number for a credit card or financial deposit account; the Social Security Number of a patient; the account number of an ATM card; or the like. In order to better describe these critical aspects of the present invention, however, reference is now made to the deployment diagram of FIG. 5, wherein there is shown the various elements of an exemplary hardware and software based implementation of an authentication system 30 constructed in accordance with the teachings of the present invention.

Figure 5:
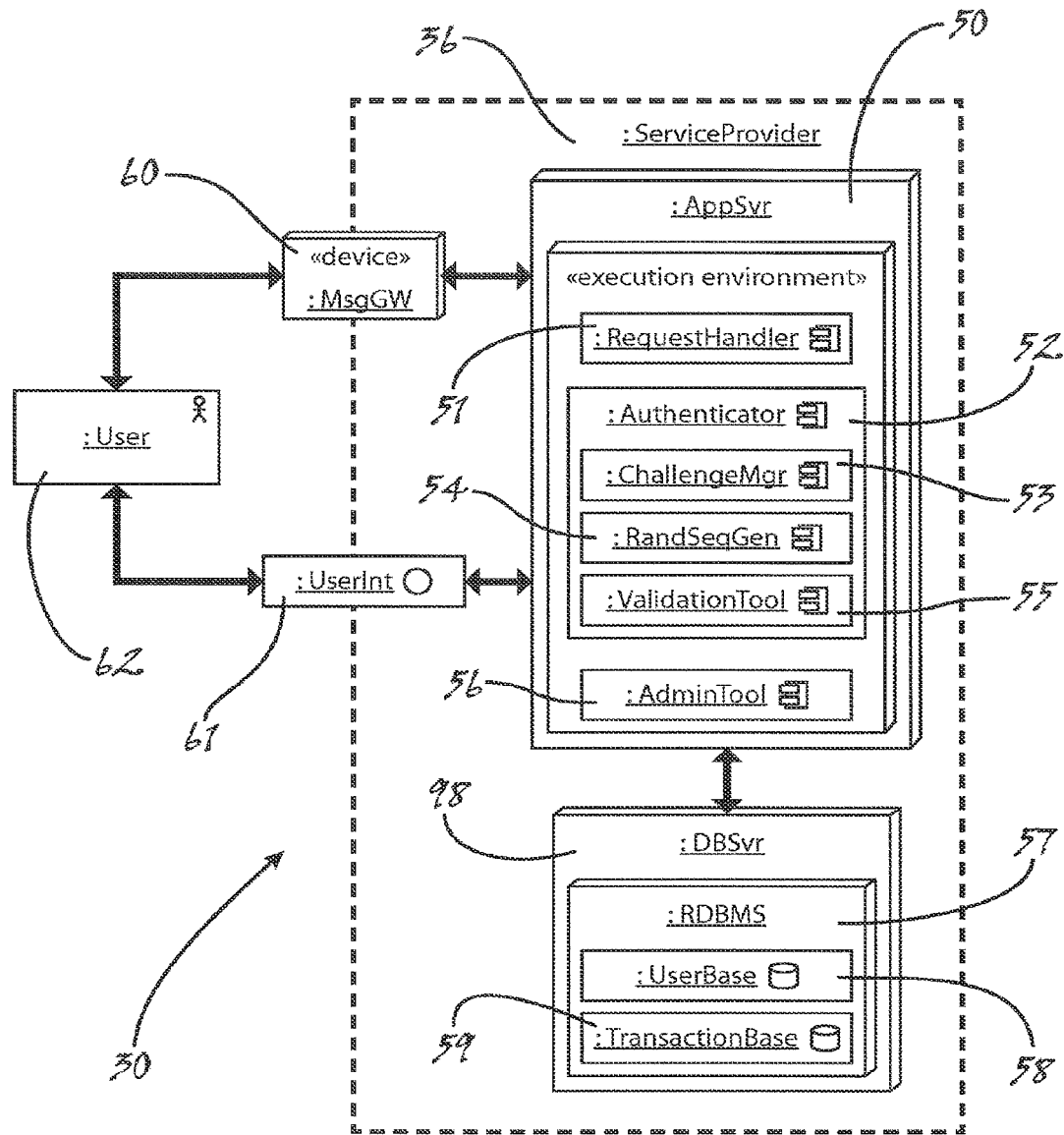
FIG. 5 shows, in a deployment diagram, an exemplary hardware and software implementation of the authentication system and method of the present invention.

Before continuing, however, it is noted that while the implementation depicted in FIG. 5 is exemplary of the authentication system 30 of the present invention, it is in no manner meant to be all encompassing or otherwise limiting of the wide range of implementations as are possible. In addition, it is noted that while some elements are in FIG. 5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 5, a service provider 36 (such as, for example, may comprise a specialized provider of the authentication services of the present invention; a provider of other products or services having need of authentication services, such as, for example, a credit card processor or financial institution or an alarm monitoring company; or the like) is shown for purposes of this exemplary discussion to have associated therewith one or more application servers 50 or database servers 98 upon which may be hosted software functionality necessary to operation within the framework of the present invention. In particular, an application server 50 may host a request handler software component 51 adapted to receive, process and/or otherwise handle request messages 84 from end users 34 and submissions from end users 34 or service clients 33 as well as to produce output for end users 34 and/or service clients 33 as may be necessary in the operation of the present invention. Additionally, the application server 50 may host an authenticator 52 adapted to handle or otherwise control all aspects of the authentication process within the realm of responsibility of the service provider 36, including receiving authentication requests, storing and/or retrieving data pertinent to the processing of such requests, directing the generation and sending of challenge messages 94, and directing the validation of credentials submitted in response to challenge messages 94 and actions taken based upon the results of such validations. In order to improve efficiency, the authenticator component 52 may comprise one or more further specialized components such as, for example, a challenge manager 53 adapted to facilitate creation and transmission of challenge messages 94, a random sequence generator 54 as may be useful in the highly specialized task of creating random sequences which, as will be better understood further herein, are an integral feature of the present invention, and a validation tool 55 adapted to conduct the specialized task of comparing received credentials with known key strings. Still further, the application server 50 may also host an administration tool 56 through which various aspects of the setup, maintenance and operation of the hardware and software systems of the service provider 36 may be managed.

Figure 7:
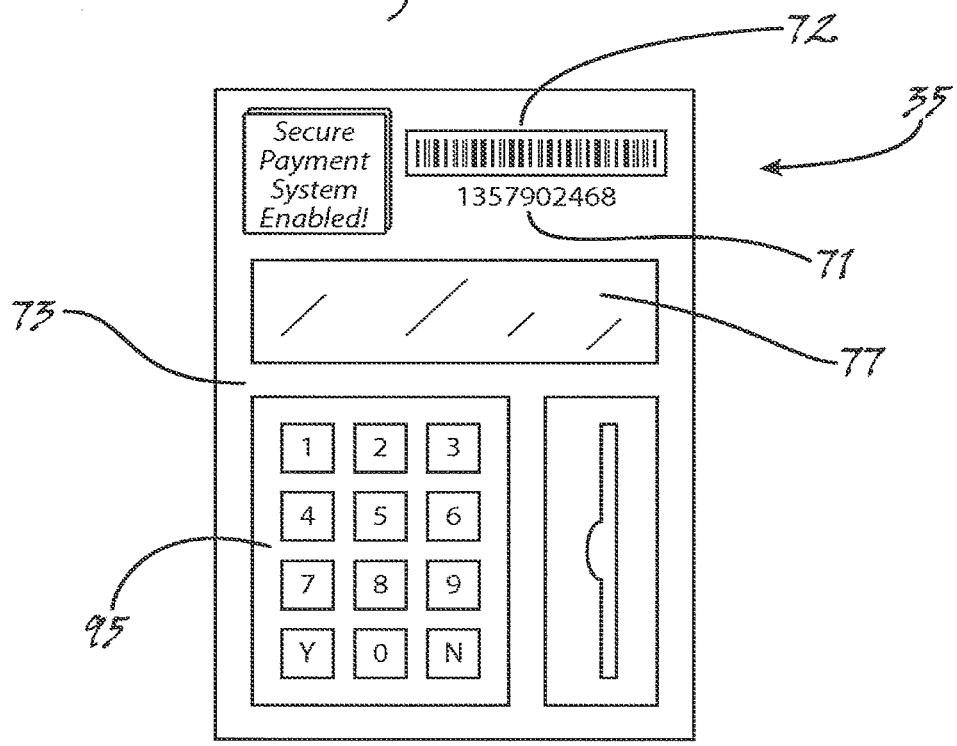
FIG. 7 shows, in a class diagram, a high level schema for a representative user database as may be implemented in connection with the exemplary hardware and software implementation of FIG. 5.
Figure 7:
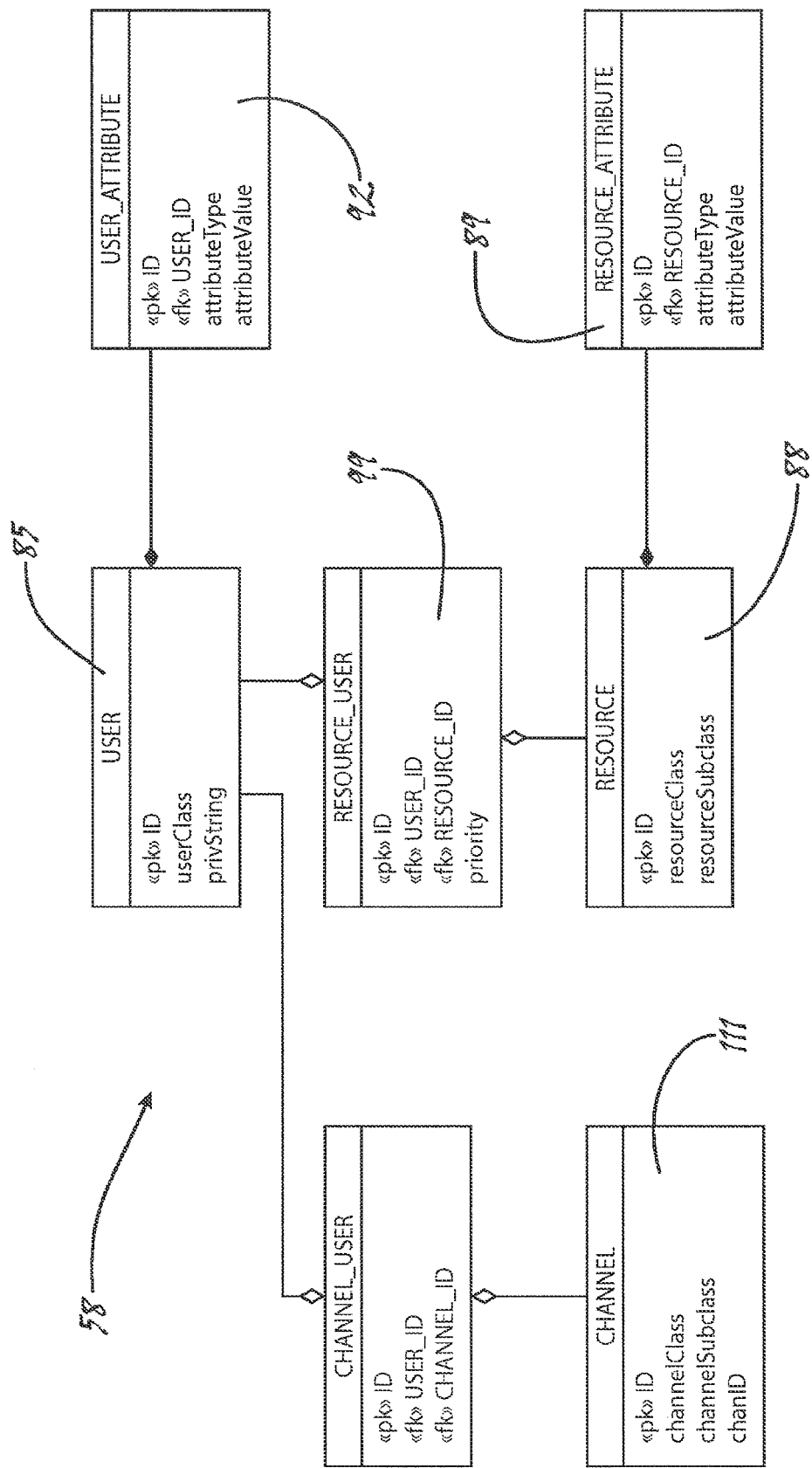
Figure 8:
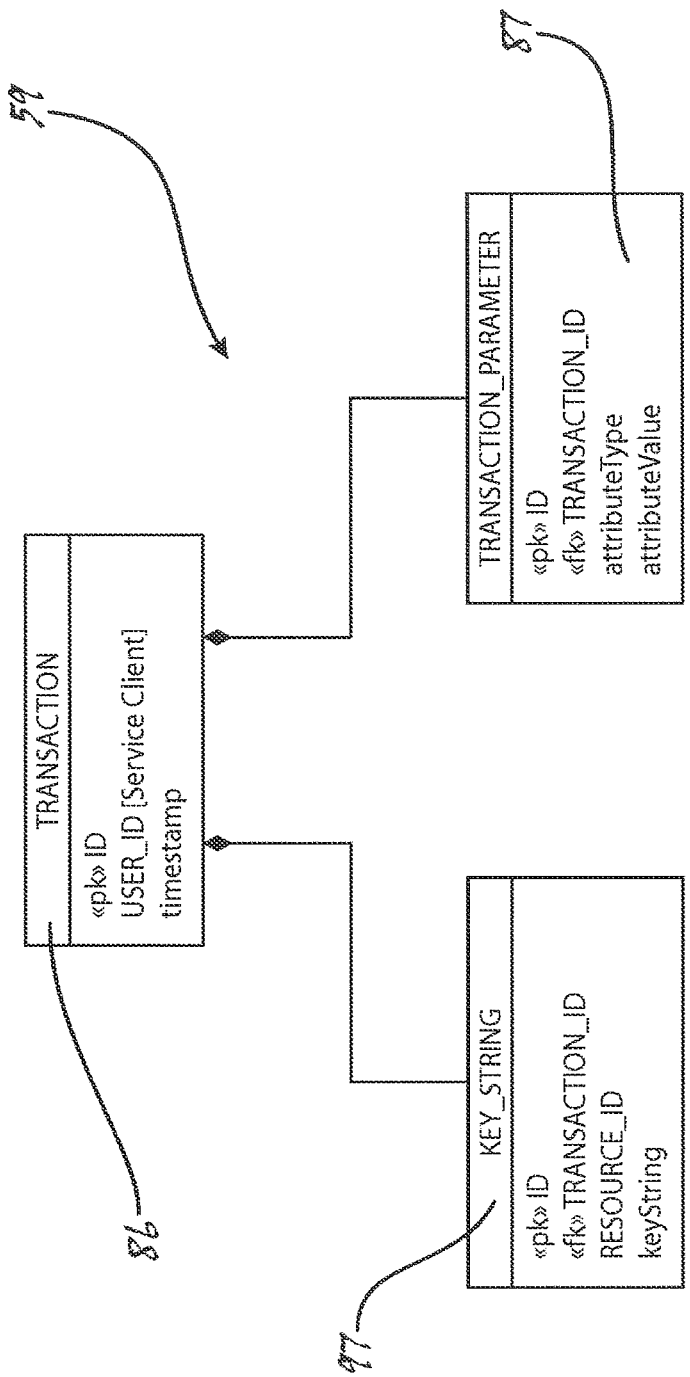
FIG. 8 shows, in a class diagram, a high level schema for a representative transaction database as may be implemented in connection with the exemplary hardware and software implementation of FIG. 5.

In order to efficiently manage and handle the large quantity of data that may typically be stored in connection with an implementation of the present invention, one or more dedicated database servers 98 hosting database management systems 57 are generally desired. As shown in FIG. 5, a typical database management system 57 may include a user database 58 for storing a wide variety of generally user centric data as may be required in the operation of the present invention and a transaction database 59 for storing data generally associated with the conduct of individual transactions. Although those of ordinary skill in the art will recognize that virtually unlimited alternatives are possible, FIG. 7 shows a very high level but generally representative schema for a user database 58 and FIG. 8 shows a very high level but also generally representative schema for a transaction database 59, each of which will be described in greater detail further herein in connection with an exemplary description of the conduct of a typical transaction.

Figure 6:
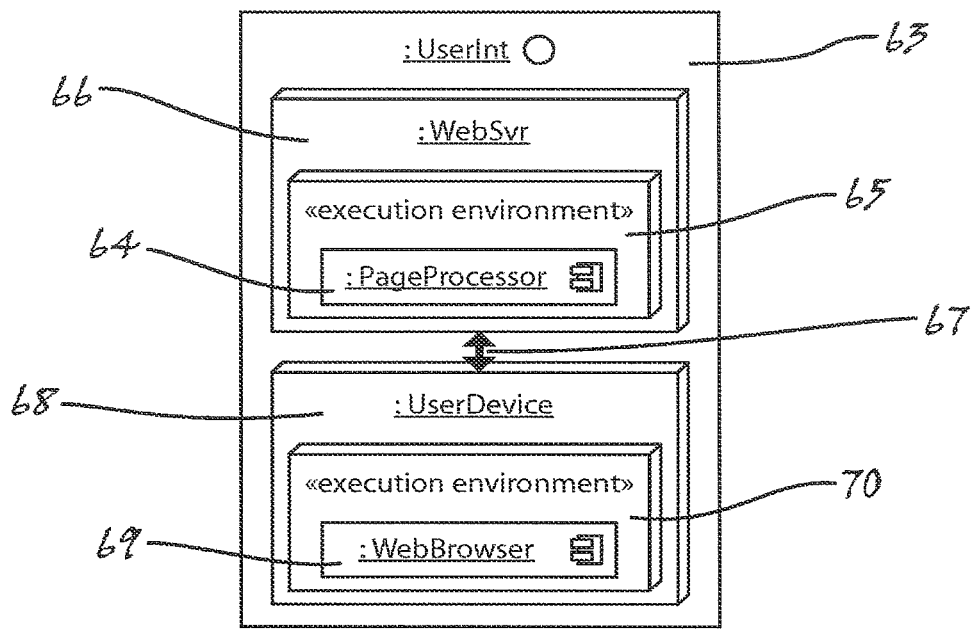
FIG. 6 shows, in a deployment diagram, various details of at least one particular implementation of a user interface for use in connection with the exemplary hardware and software implementation of FIG. 5.

Additionally, a preferably unified messaging gateway 60 is provided for use in receiving request messages 84 from and issuing challenge messages 94 to end users 34 through various communication channels. As will be appreciated by those of ordinary skill in the art, such a unified messaging gateway 60 may be utilized to receive a request message 84 or transmit a generated challenge message 94 in any of a plurality of message formats (such as, for example, as a short messaging service ("SMS") message, a standard text message, an e-mail message, a synthesized voice message, an alphanumeric page or the like) over any of a plurality of communication channels (such as, for example, an SMS or other text channel, a simple mail transport protocol ("SMTP") channel, a plain old telephone system ("POTS") channel, a paging network or private broadcast channel or the like) to be received by any of a plurality of user devices (such as, for example, a mobile or landline telephone, a smart phone, an e-mail client, a personal data assistant ("PDA"), a numeric or digital pager or the like). Still further, a service user interface 61 is provided and adapted to provide input from all manner of users 62, including administrative users, end users 34 and service client users 33, to the hardware and/or software systems of the service provider 36 and to provide output from these systems to the various users 62. Although the service user interface 61 may take a wide variety of forms depending upon the circumstances of any particular implementation, a typical user interface may be implemented as a web interface 63, as shown in FIG. 6, wherein there may be provided a page processor 64 hosted on an appropriate execution environment 65 installed on a dedicated web server 66 in Internet communication 67 with a user device 68, such as, for example, a personal computer, smart phone, other mobile device 78 or the like, and on which is installed and/or hosted a web browser 69 running in a provided execution environment 70. In any case, as will be appreciated by those of ordinary skill in the art, the provision of a service user interface 61, which of course should be secured, enables the various users 62 to maintain and/or otherwise manage the data stored in the user database 58 as may be appropriate as well as to generally manage and maintain the implemented authentication system 30. Finally, one or more resource communication gateways (not shown) may be provided in order to establish preferably secure communication between the systems of the service provider 36 and outside resource providers 43.

Continuing then with the example generally described with respect to FIG. 5, further details of the implementation are now described by way of the following detailed description of a possible use of the implementation for conducting a retail purchase transaction, which, for purposes of the example, shall be taken as completion of a purchase at an automobile fueling station, a restaurant or an on-line retailer (the service client 33) by a consumer (the end user 34) having available for payment a credit card and a checking account (secured resources). To complete the transaction, the consumer will indicate a desire to make a payment to the automobile fueling station, restaurant or on-line retailer by submitting to a service provider 36 a request for payment to the service client 33 and for authentication of the consumer's right of access to an identified secured payment resource, whereafter the service provider 36 will establish for the consumer an authentication credential to be provided to the service client 33. The service client 33 will then forward the authentication credential to the service provider 36 for validation in order to obtain payment from the identified secured payment resource as requested by the consumer. In accordance with a critical aspect of the present invention, however, the automobile fueling station, restaurant or on-line retailer cannot be provided with or otherwise be made aware of either the consumer's credit card or checking account number and also must not be given any information that would allow the automobile fueling station, restaurant or on-line retailer to repeat the transaction without again obtaining authorization from the consumer.

Figure 10:
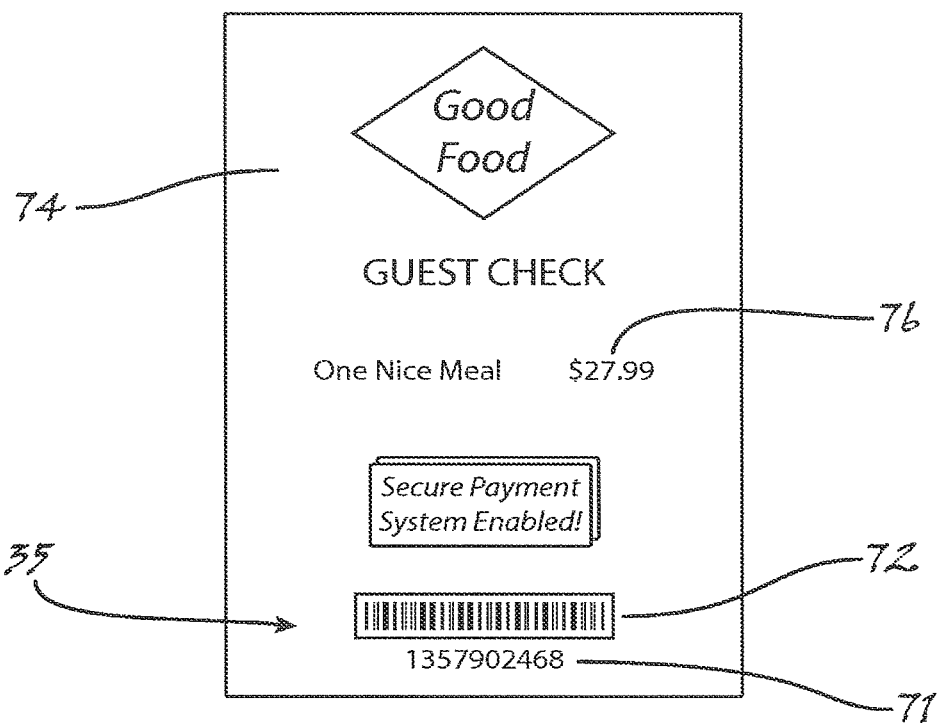
FIG. 10 shows, a top plan representation of a guest check, particularly showing representative means for identifying the service client as implemented in connection with a document.
Figure 11:
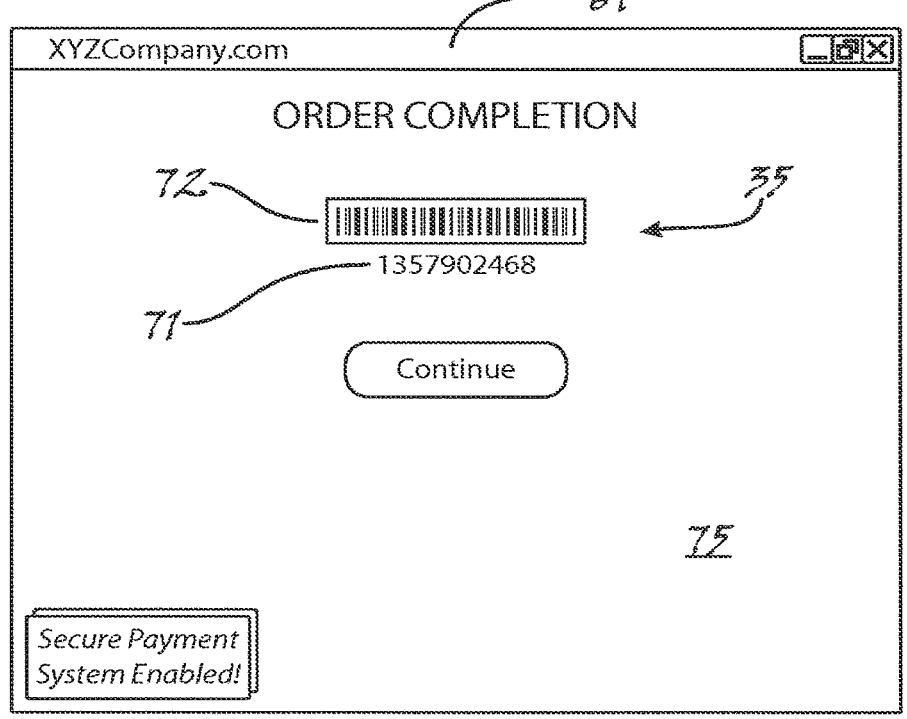
FIG. 11 shows, in a screen representation of a web browsing application, representative means for identifying the service client as implemented in connection with an on-line application.

As previously discussed, the authentication method 46 of the present invention generally begins with an end user 34 obtaining from a service client 33 data or other information necessary for the end user 34 to request that a service provider 36 provide for the service client 33 access to a secured resource. As also previously discussed, this data or other information will generally comprise the identification of the service client 33. Referring then to FIGS. 9 through 11 in particular, representative means 35 for identifying a service client 33 are shown to comprise an alphabetic and/or numeric identification code 71 and a machine readable identification code 72 such as, for example, a barcode or like representation. As particularly shown in FIG. 9, one or more such means 35 may be affixed by printing, placard or other labeling or electronically displayed on a screen, monitor or the like of a point-of-sale ("POS"), fueling station, automated teller machine ("ATM") or like terminal device 73. As particularly shown in FIG. 10, one or more such means 35 may be printed on a guest check 74, sales slip, invoice or the like prepared in anticipation of the completion of a financial transaction or on a similarly formatted request document such as, for example, a consent form for access to medical records, credit records or the like. As particularly shown in FIG. 11, one or more such means 35 may be displayed on a webpage 75, as part of a computer or like application program such as, for example, may be generated or otherwise provided in connection with an on-line financial transaction, activation or deactivation of an alarm system, access to or control of a computer or other machine, control of a door lock or a like application.

As also previously discussed, the data or other information obtained from a service client 33 may additionally comprise any other data or information as may be helpful for the conduct of a particular transaction such as, for example, a purchase amount 76, a client reference, detailed or itemized transaction data or the like. To this end it is noted that in most cases a means 35 for identifying a service client 33 may be dynamically generated on a transaction-by-transaction basis. For example, in the case of FIG. 9 representing a fueling station terminal device, the numeric identifier and/or barcode could be generated by the fueling station controller and displayed on the depicted screen, whereby the information collected by the end user 34 for use in submitting a request message 84 to the service provider 36 may include, for example, a transaction number or the like. Similarly, in the case of FIG. 9 representing an ATM terminal device, the numeric identifier 71 and/or barcode 72 could be generated by the ATM controller in at least partial reliance on user submitted information and, thereafter, displayed on the depicted screen 77, whereby the information collected by the end user 34 for use in submitting a request message 84 to the service provider 36 may include, for example, the amount of a withdrawal or other transaction, the types of accounts to use in completing the desired transaction or the like. In the case of FIG. 10 representing a document created for a particular transaction or in the case of FIG. 11 representing a computer or other dynamically created display, those of ordinary skill in the art will recognize that virtually any type of data or other information may be included for use by the end user 34 in submitting a request message 84 to the service provider 36.

Still further, however, the data or other information may for enhanced security include, in addition to the identification of the service client 33, a dynamically generated value that must be included as part of the identification of the service client 33 in order for a request message 84 submitted by an end user 34 to be accepted by a service provider 36. In implementation of such a feature, the end user 34 will generally provide some input to the service client 33 indicating that the end user 34 wants to make use of the service 30. At this point, the service client 33 will, preferably through a secured communication channel, request and obtain from the service provider 36 a uniquely formulated identification for use only in connection with the present transaction. The obtained unique identification is then used by the service client 33 and the end user 34 in the same manner as otherwise would be used a static identification. As will be appreciated by those of ordinary skill in the art, this feature is particularly useful in the detection and/or prevention of man-in-the-middle or other spoofing type deceptions.

Figure 12:
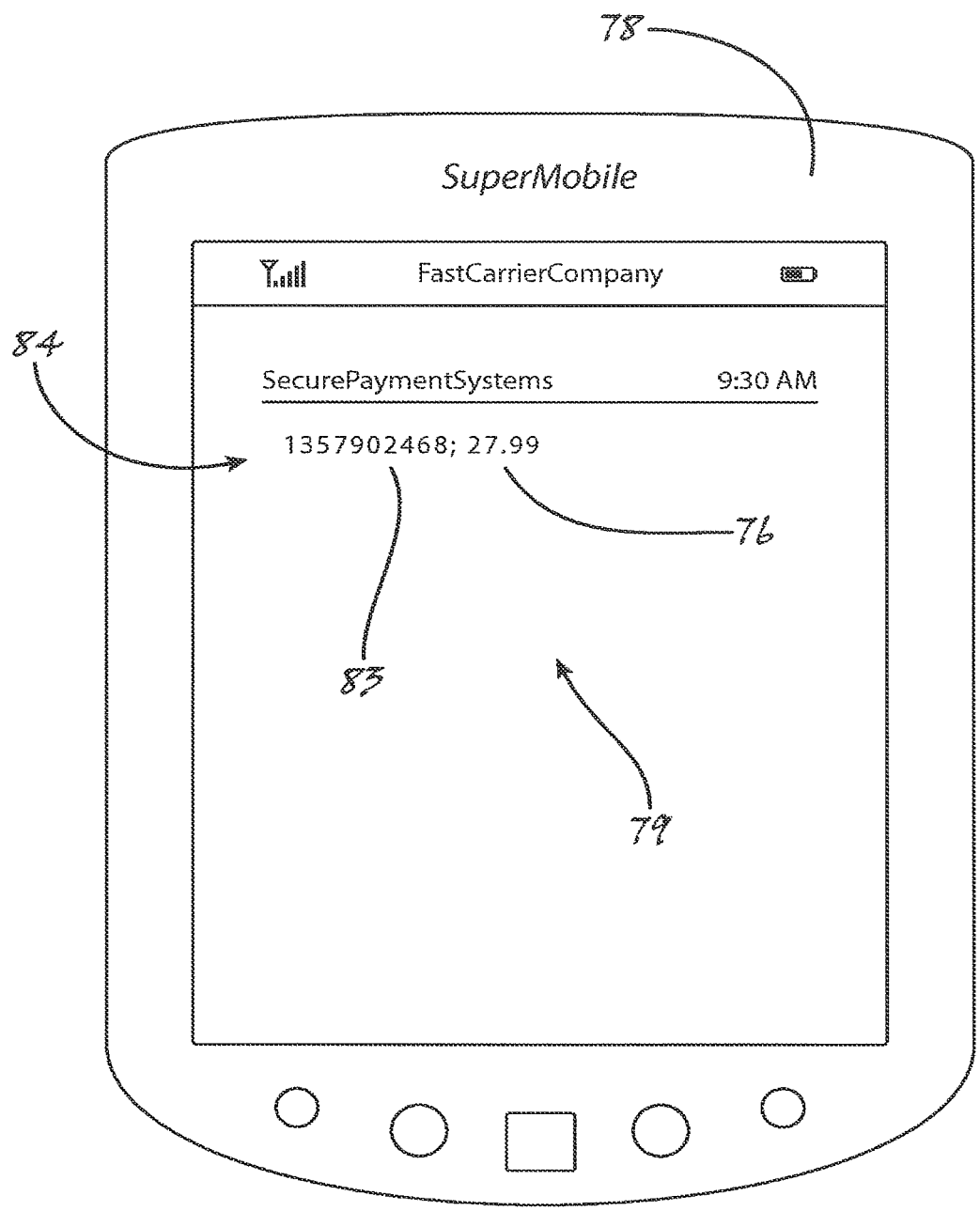
FIG. 12 shows, in a top plan representation of a mobile telecommunications device screen, an example of a request message such as may be utilized in accordance with the present invention.
Figure 14:
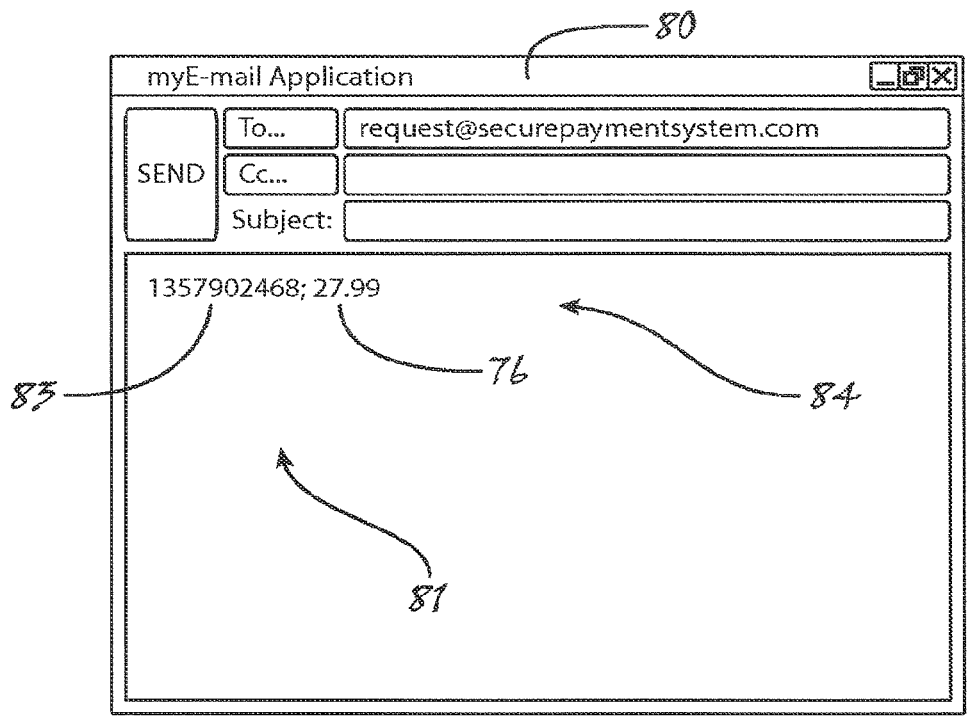
FIG. 14 shows, in a screen representation of an electronic mail application, a further example of a request message such as may be utilized in accordance with the present invention.
Figure 16:
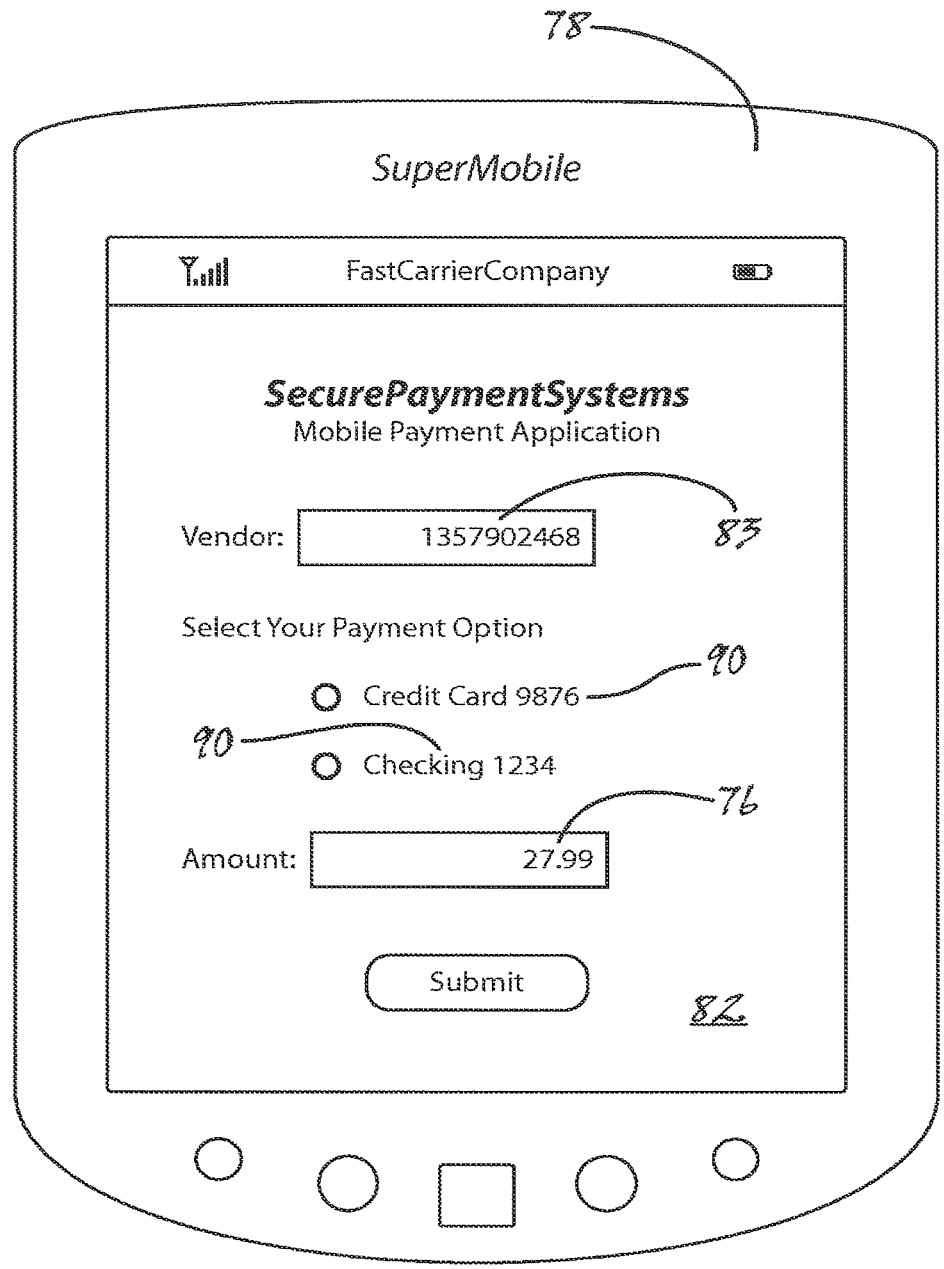
FIG. 16 shows, in a top plan representation of a mobile telecommunications device screen, a further exemplary implementation of an interactive generation of a request message in accordance with the present invention.

In any case, as also previously discussed, the service client provided information is then utilized by the end user 34 to submit a request message 84 to the service provider 36 for requesting that the service provider 36 provide for the service client 33 access to a secured resource. To this end, the end user 34 will require a means 38 for communicating the request message 84 to the service provider 36. As shown in FIG. 12, a mobile device 78, such as a cellular telephone, smart phone or the like, may be utilized to send an SMS or standard text message 79 over any available SMS or standard text capable communication channel to the messaging gateway 60 implemented for the service provider 36. Similarly, as shown in FIG. 14, an electronic mail client 80 may be utilized to send an electronic mail message 81 over any electronic mail capable communication channel to the messaging gateway 60 implemented for the service provider 36. Additionally, a web interface 63, which may be implemented as or in connection with the service user interface 61, may be utilized to enable the end user 34 to interactively communicate the request message 84 to the service provider 36. While implementation of the web interface 63 will generally dictate establishing at least some login functionality, which minimally would include requiring the provision of a user name or the like by which the service provider 36 can identify the particular end user 34 making a submission, those of ordinary skill in the art will recognize that such an implementation also has the advantage of providing the end user 34 with broad flexibility in tailoring of the request message 84 to any particular transaction. Still further, as shown in FIG. 16, a user application 82, which may be adapted for use on or in connection with a mobile device 78, a personal computer or any other appropriate hardware, may also be provided. As will be appreciated by those of ordinary skill in the art, implementation of such a user application 82 will not only provide generally the same advantageous flexibility as a web interface 63, but also may be provided with means for securely identifying the end user 34 to the service provider 36. For example, such a user application 82 may have embedded therein a token or other identifier, which may be encrypted if desired, for passage to the service provider 36 to identify the end user 34. In any case, it is also noted that because any desired formatting may generally be effected by a user application 82 such a user application 82 may also be adapted to communicate with the messaging gateway 60 or other user interface 61 implemented for the service provider 36 over virtually any communication channel including, for example and without limitation, an SMS or standard text capable communication channel, an SMTP capable communication channel, a POTS communication channel, a hypertext transfer protocol ("HTTP"), secure hypertext transfer protocol ("HTTPS"), file transfer protocol ("FTP") or other Internet or like network transfer protocol communication channel. Finally, it is noted that other devices and communication channels may also be utilized for submission by an end user 34 of a request message 84 to the service provider 36 as well as for communication by the service provider 36 to the end user 34 of a challenge message 94. For example, and without limitation, the means 38 for communicating a request message 84 to a service provider 36 and/or means 39 for communicating a challenge message 94 to an end user 34 may also comprise a telephone auto attendant, which may implement a DTMF decoder, speech recognition engine, TDD/TTY decoder or the like, or virtually any other combination of input modalities (including barcode readers or scanners, keyboards, keypads, pointing devices, microphones and the like) and output modalities (including visual displays such as computer or other device monitors or screens, audio output devices such as headphones or other speakers, tactile output devices such as may be adapted for the visually impaired and the like).

As particularly shown in FIGS. 12 and 14, a typical request message 84 may simply comprise information 83 identifying the service client 33 (such as, for example, a credit card program merchant identification number, a service provider issued or registered identification number or other identifier or the like) and, if necessary for the particular transaction, one or more additional parameters (such as, for example, a purchase amount 76 or the like). As exemplified by the depicted examples, the request message 84 may be formatted according to a predetermined pattern or other scheme, which, as will be appreciated by those of ordinary skill in the art, is particularly advantageous in implementations wherein the end user 34 may be required to submit the request by text message 79, inasmuch as such a formatted input will generally require only a bare minimum of data entry by the end user 34. In any case, it is noted that in the examples of FIGS. 12 and 14 the request message 84 does not include identifying information for the end user 34. As will be appreciated by those of ordinary skill in the art, however, such information may be obtained by the service provider 36 by examining the telephone number from which the text message 79 was sent, in the case of FIG. 12, or by examining the "reply to" electronic mail address from which the electronic mail message 81 was sent, in the case of FIG. 14.

Figure 15:
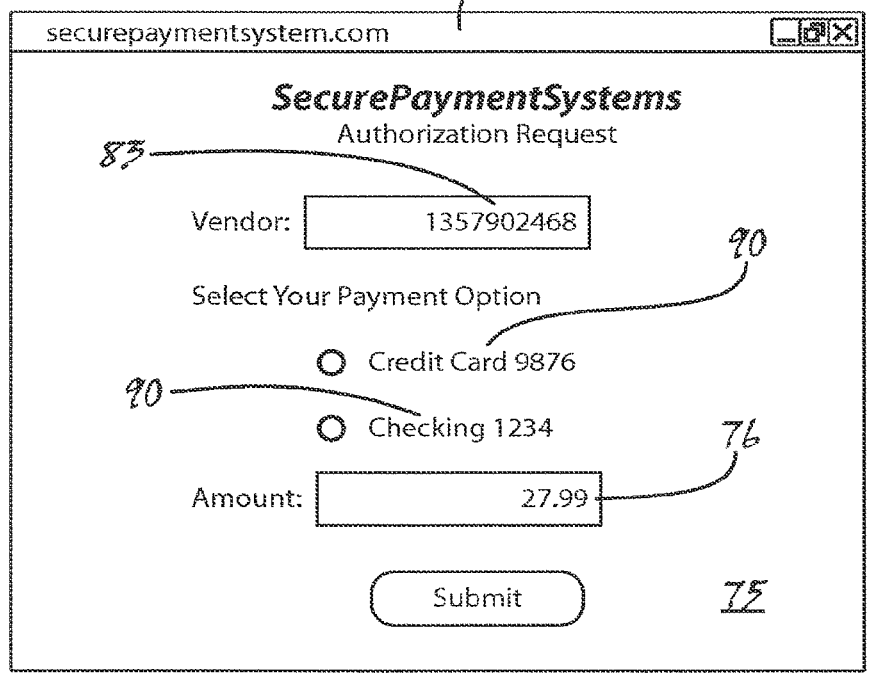
FIG. 15 shows, in a screen representation of a web browsing application, an exemplary implementation of an interactive generation of a request message in accordance with the present invention.

As particularly shown in FIGS. 15 and 16, the request message 84 may be formatted for transmission by the implemented website page processor 64 and/or user application 82, the details of which formatting will generally not need to be known by the end user 34. Additionally, it is noted that the information provided in either depicted implementation may be manually entered by the end user 34, automatically entered through a barcode reader (which, in the case of a mobile application 82 may be provided in connection with the camera application of a mobile device 78), or through a combination of manual and automatic entry. Additionally, these implementations are readily adapted to include any number of convenience features. For example, the screen as depicted in FIG. 16 may be produced as a result of scanning the barcode provided on the guest check 74 depicted in FIG. 10, but prior to submitting the request to the service provider 36 the end user 34 may change the amount 76 from "27.99" to "33.99," which may, under the circumstances of the transaction (including, for example, the knowledge that the service client 33 is a restaurant), be automatically interpreted by the service provider 36 as an indication that the end user 34 wishes to add a tip in the amount of $6.00 to the purchase price 76. In any case, once the request message 84 is assembled and/or formatted, if required, by the end user 34, the request message 84 is submitted to the service provider 36.

Once the request message 84 is received by the implemented messaging gateway 60 or, if appropriate, service user interface 61, the nature of the request will be identified and the request message 84 will then be routed to the request handler 51 hosted on the service provider's application server 50. Upon receipt of the consumer's request message 84, the request handler 51 will generally first undertake to determine whether the purported end user 34 is recognized at the service provider 36. To this end, the request handler 51 may access the user database 58, as generally shown in FIG. 7, to determine whether the provided or inferred end user 34 identification can be located in the user table 85. If not, the authentication process 46 will generally terminate. If, on the other hand, the provided or inferred end user 34 identification is recognized the request handler 51 will proceed to establish a new transaction record in the transaction table 86 of the transaction database 59, as generally shown in FIG. 8, and at this time should also store in the transaction record the unique USER_ID by which the automobile fueling station, restaurant or on-line retailer is known in the user database 58. Additionally, any other pertinent provided information such as, for example, the client reference, purchase amount 76 or the like, may be stored in the transaction parameter records 87, which will be created as required.

With the new transaction record established and known pertinent information appropriately stored, the request handler 51 then undertakes to identify a particular secured resource for fulfillment of the consumer's request. As previously noted in the setup to the present example, however, the consumer wishing to make payment to the automobile fueling station, restaurant or on-line retailer has more than one secured payment resource available for use, which information will become known to the request handler 51 upon searching the resource table 88 of the user database 58 for secured resources associated with the USER_ID by which the tentatively identified consumer is known.

As shown in the exemplary user database 58 of FIG. 7, the resource table 88 is preferably provided with the ability to store at least an indication of the class and subclass of each resource, which in the example given may identify the consumer's credit card account and checking account as both being of the class "payment" and, further, may identify the credit card account as being of the subclass "program X" and the checking account as being of the subclass "checking." While the indication that the consumer has requested a payment is sufficient to identify these two candidate resources, it is insufficient without more to determine which of the two should be utilized to continue the transaction. To this end, the authentication system of the present invention is preferably provided with means for determining a particular resource for access on the authority of the end user 34.

In a first example of such a means a priority may be assigned by each user 34 of a resource to the particular resource, whereby resources of a particular class or, if the service client 33 accepts only a certain subclass, on the basis of a particular class and subclass the available resources meeting the selection criteria may be sorted to determine the appropriate resource for use. Such priority values may, for example, be stored in the resource user table 99 of the user database 58 as depicted in FIG. 7.

Figure 13:
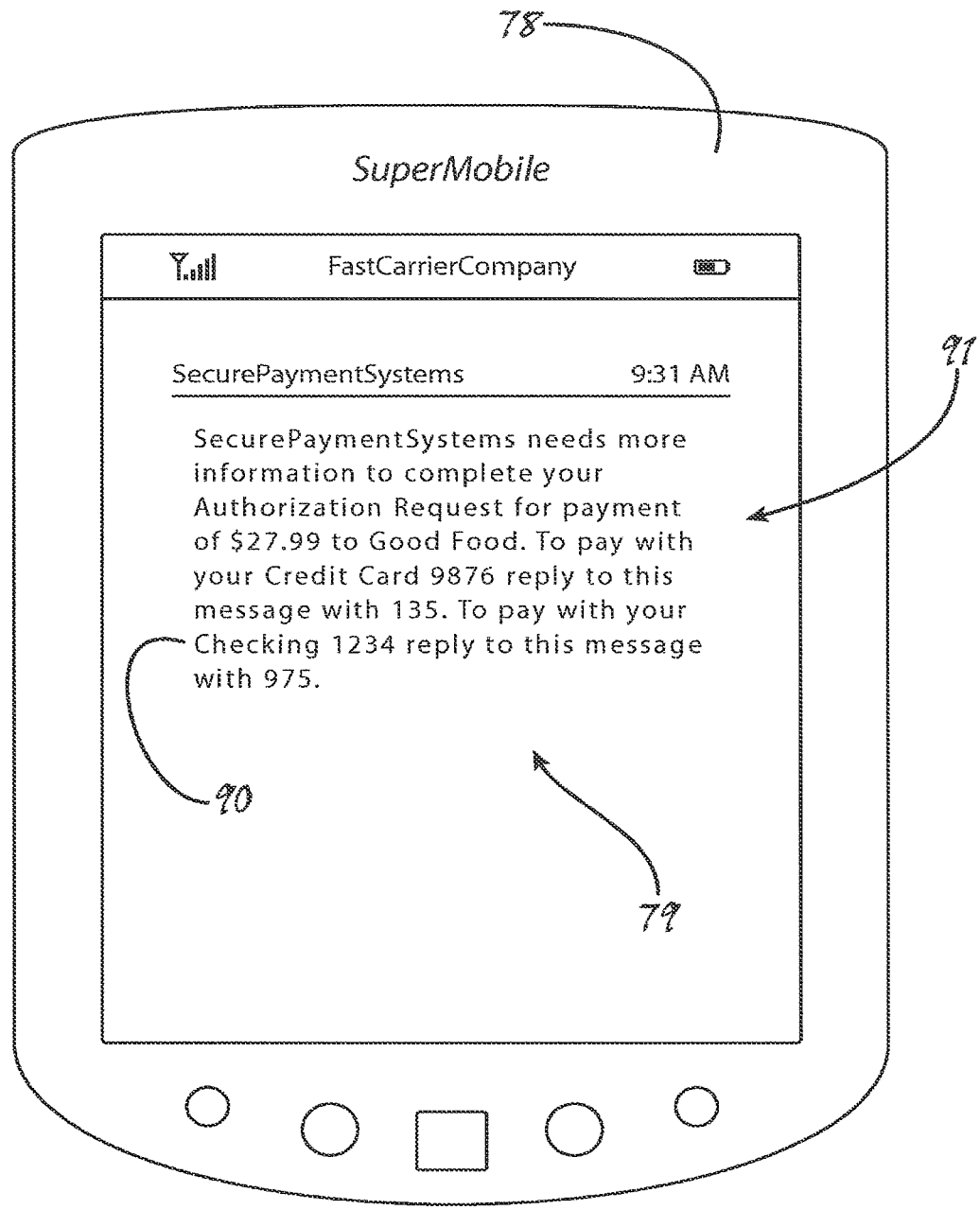
FIG. 13 shows, in a top plan representation of a mobile telecommunications device screen, an example of an inquiry message such as may be implemented in accordance with the present invention.

In a second example of such a means each resource may be assigned a pseudonym 90 comprising generally non-identifying information but nonetheless information which is unique among the class of resource for any particular user, which pseudonyms may be stored in the resource attribute table 89 of the user database 58. Making use of the stored pseudonym 90, this means for determining a particular resource for access by the end user 34 comprises generating an inquiry message 91 for transmission to the end user 34 whereby the service provider 36 requests that the end user 34 select one resource based on the assigned pseudonym. As particularly shown in FIG. 13, such an inquiry message 91 may be sent by generally any means available for communication with the end user 34, including any means appropriate for submitting request messages 84 or issuing challenge messages 94, and is preferably formatted for simple reply.

In the example implementation (assuming that no priority information was stored), upon determining that the tentatively identified end user 34 has more than one secured payment resource, but that each available resource has associated therewith a pseudonym 90, the service provider 36 would generate an inquiry message 91 for transmission to the end user 34, which inquiry message 91 may request that the consumer enter a simple response indicating whether he or she wishes to proceed using his or her "Credit Card 9876" or using his or her "Checking 1234." Once generated, the request handler 51 will generally queue the inquiry message 91 at the service provider's messaging gateway device 60 for transmission to the consumer. The consumer may then select the desired payment option and respond, causing an updated request message 84 to be routed to the request handler 51. At this point the request handler 51 will again undertake to identify a particular secured resource for fulfillment of the consumer's request.

Finally, in a third example means for determining a particular resource for access by the end user 34, the determination is deferred and made in connection with issuing 39 a challenge message 94 to the end user 34. This means will be described in greater detail further herein in connection with further description of the challenge process.

In any case, once an appropriate particular secured resource is identified for access, any remaining transaction parameters, including the unique RESOURCE_ID by which the identified resource is known in the user database 58, is preferably stored in the transaction database 59 as shown in FIG. 8. With the end user 34 and the resource for which the end user 34 requests access both identified and logged to the transaction database 59, the authenticator 52 hosted on the service provider's application server 50 takes control from the request handler 51 and undertakes to direct the generation of an appropriate challenge message 94, the response to which may be used to positively authenticate the identity of the presently tentatively identified end user 34.

In order to best understand the challenge and response protocols of the present invention, however, it is instructive to expressly define a number of terms. To that end, a "string" shall for purposes of the present invention be expressly defined to mean "an ordered sequence of any subset of symbols selected from a set of symbols wherein each symbol forming the set may be represented in both a format that may be perceived by an end user 34 and a format that may be recognized by software or hardware," e.g. the set of all alphabetic and numeric characters in the English language, each of which, of course, may be presented in written or audible form for perception by an end user 34 and also may be encoded as binary data for recognition by software or hardware. A "null character" shall for purposes of the present invention be expressly defined as "a specially designated symbol intended to indicate the absence from a sequence of a single symbol," e.g. a box with an X character, as shown in the drawings forming a part of this specification, any symbol (such as a particular number, particular letter, an asterisk, an underscore or the like) designated at implementation to be defined as being a null character or a blank space. "Random" as applied to the characterization of a string shall for purposes of the present invention be expressly defined to mean that the symbols of the string are arranged in an order that is not readily predictable.

In accordance then with the authentication system 30 and method 46 of the present invention, the challenge is generated to include a random string comprising a plurality of symbols wherein at least one of the symbols of the string is a null character, such a random string being referred to herein as a challenge string 49. Additionally, each end user 34 (and, if desired, also other types of users such as client users 33 and/or administrative users) will have stored in the user table 85 of the user database 58 a private string, which is a user selected or assigned (depending on implementation preferences) string comprising symbols of the same set as used for generating the challenge string 49 but most preferably excluding use of the null character. The private string is generally only known to the user with which it is associated and the service provider 36. As will be better understood further herein, a user will formulate a response to a challenge string 49 by using the symbols of the user's private string to replace the null character or characters of the challenge string 49 to formulate a response string. In this manner, the response string may be passed through the service client 33 without the service client 33 being able to detect the private string and, accordingly, a system of readily established single use "passwords" is presented. Additionally, as also will be better understood further herein, the authentication system 30 and method 46 of the present invention may be implemented such that the protocol for creating a response string from a challenge string 49 is standardized in advance or, in the alternative, instructions may be provided with the challenge message 94 or inferred from the manner of delivery of the challenge message 94 or circumstances of the use. For example, the user may be directed to formulate the response string using only numbers of the private string or may assume that only numbers should be used when entering the response string into a limited keypad 95 such as depicted in FIG. 9. Further, instructions may be given to use every second or third symbol of the private string, to begin with a certain symbol of the private string, to take symbols from the private string in reverse order, or any combination of these and similar instructions. Still further, the user may be instructed as standard procedure or by challenge message 94 to repeat usage of certain symbols of the private string or the entire private string in order to respond to a challenge string 49 with more null characters than symbols available in the user's private string and/or simply as a matter of choice by the service provider 36.

Returning then to the example use of the authentication system 30 of the present invention it is noted that in the most preferred embodiment of the present invention prior to directing the generation of a challenge message 94 the authenticator 52 evaluates all available information that may impact the ability of an end user 34 to readily receive a particular challenge message 94 and/or to readily respond to a particular challenge message 94 and, additionally, determines whether any special security requirements may exist for access to the particular resource. In particular, the authenticator 52 will preferably obtain from the channel table 111 of the user database 58 channel data indicating the type of communication channel that will be utilized to transmit the challenge message 94. Additionally, the user attribute table 92 of the user database 58 may indicate whether the end user 34 suffers any disability that would impact the manner of response and/or may contain data associated with the service client 33 that may indicate special security requirements, such as a minimum length for the response string, or capabilities or limitations of the service client user interface 73, such as being limited to entry of numeric characters only. Still further, the resource attribute table 89 of the user database 58 may also indicate special resource dictated security requirements, such as minimum length or desired complexity for a response string. In any case, the authenticator 52 will determine the characteristics that should be exhibited by the challenge string 49, including the manner of issuance, and will then instruct the challenge manager 53 to initiate issuance of a challenge message 94.

The challenge manager 53 will then obtain from the random sequence generator 54 a challenge string 49 meeting the requirements established and communicated by the authenticator 52. With the challenge string 49 generated, the challenge manager 53 will proceed to construct the challenge message 94 which will at least comprise the challenge string 49 and any special response instructions 93. With the challenge message 94 assembled, the challenge manager 53 queues the challenge message 94 by providing the messaging gateway 60 with the challenge message 94, the type of communication channel to be utilized and the CHANNEL_ID for the channel. For example, if the challenge message 94 is to be sent by text message 79, the challenge manager 53 will inform the messaging gateway 60 that the challenge message 94 is to be transmitted by text message 79 and will provide the messaging gateway 60 with a telephone number for a text capable user device 78.

Figure 17:
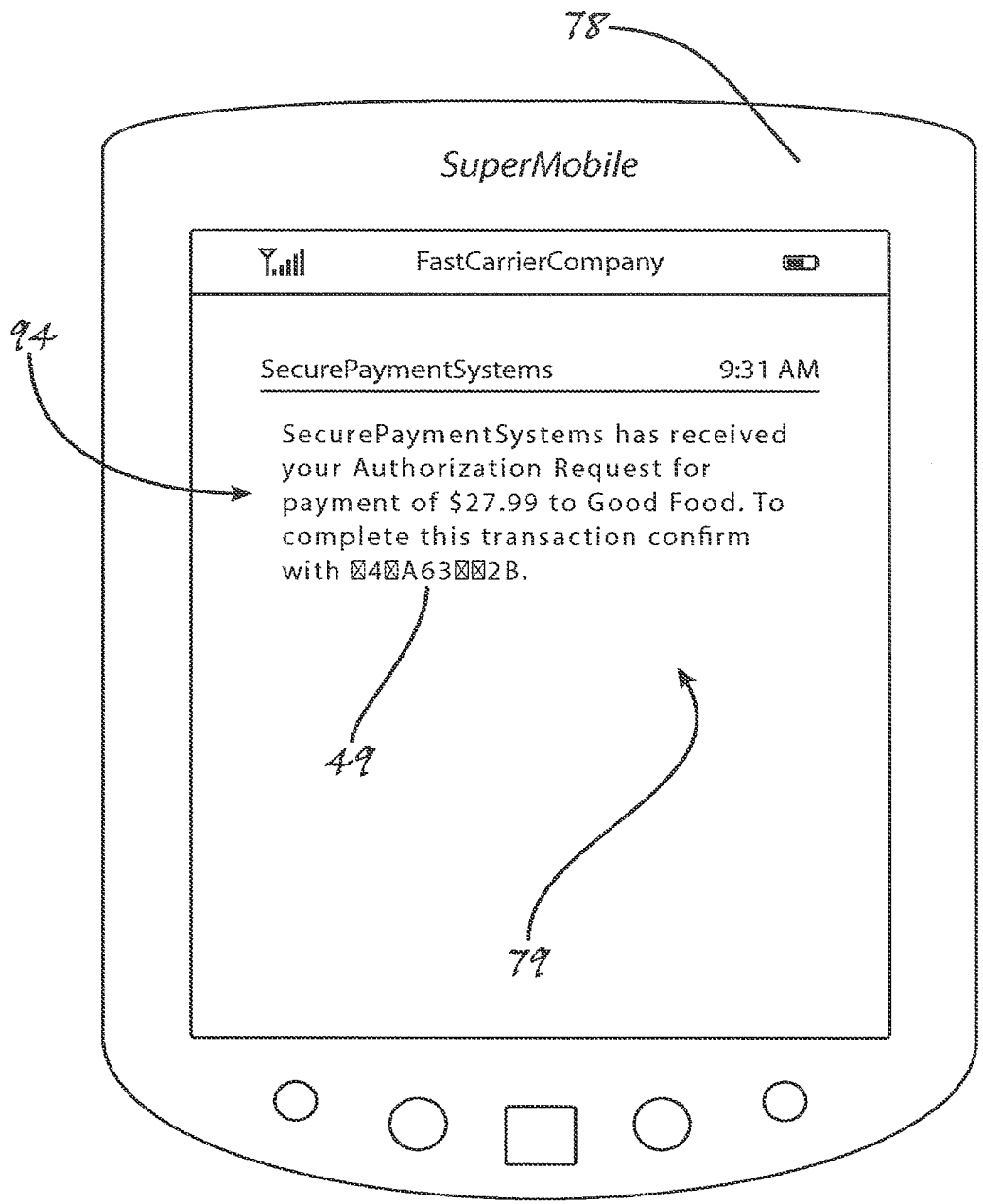
FIG. 17 shows, in a top plan representation of a mobile telecommunications device screen, an example of a challenge message such as may be implemented in accordance with the present invention.

Referring then to FIG. 17 in particular, there is shown a typical simple challenge message 94 as may be transmitted to an end user 34 through a text enable smart phone or like mobile device 78. Following with the presented example, it is noted that in an optional but useful feature of the present invention the challenge message 94 may also include information helpful to the consumer in making a response. For example, the challenge message 94 depicted in FIG. 17 includes the name of the restaurant for which the consumer made the access request and the purchase amount 76 for which the consumer requests access to his or her secured resource.

Substantially contemporaneously with transmission of the challenge message 94, the challenge manager 53 will report transmission of the challenge message 94 to the authenticator 52. The authenticator 52 then obtains the consumer's private string from the user database 58 and submits the challenge string 49 (along with any special instructions 93 included in the challenge message 94) and the private string to the validation tool 55, which in turn determines the correct response string. The determined correct response string is then assigned as the key string for the transaction and stored in the key string table 97 of the transaction database 59. At this time, a timestamp may also be entered into the transaction table 86 in order to provide a reference by which may be calculated a timeout event for the validity of the key string.

Figure 18:
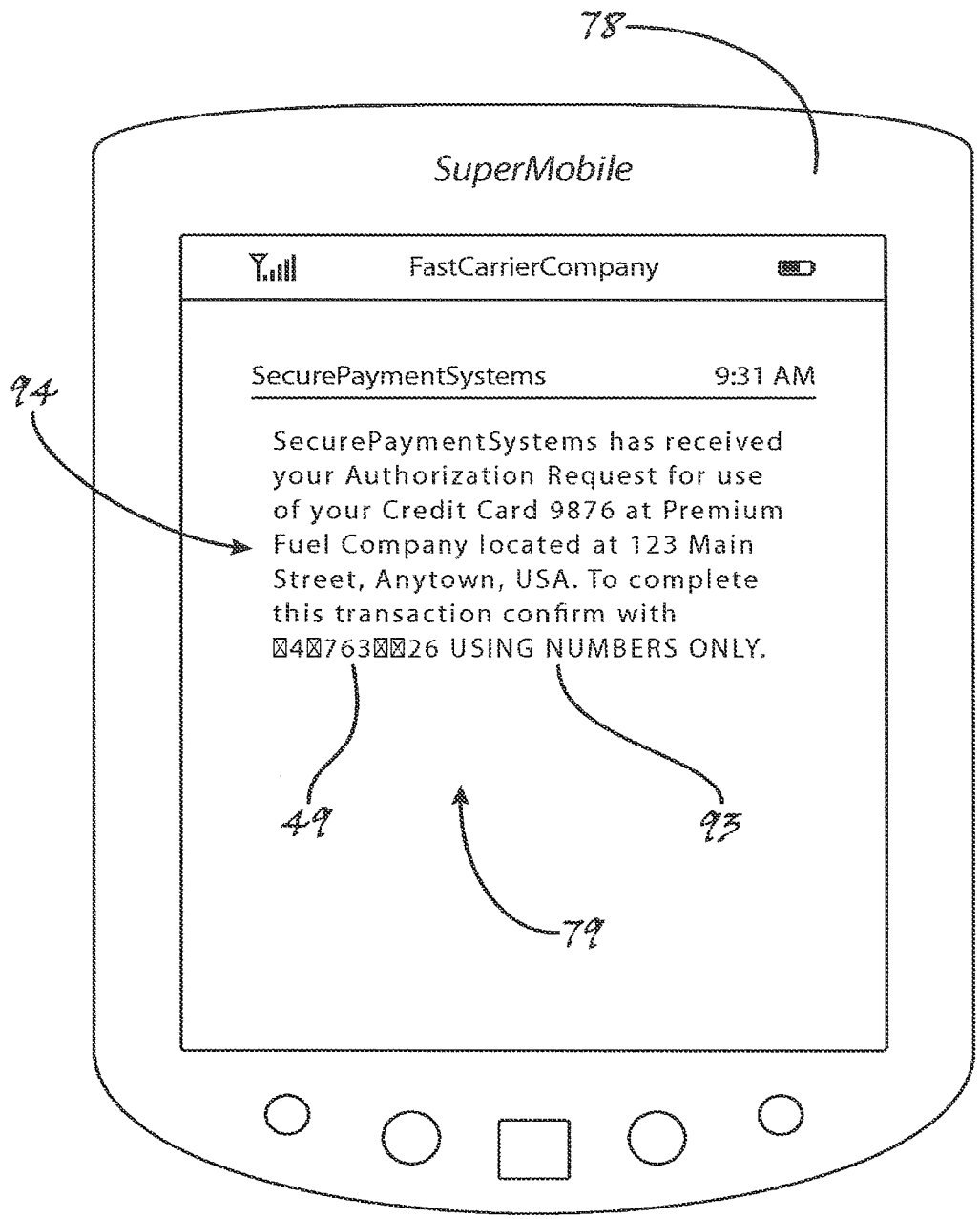
FIG. 18 shows, in a top plan representation of a mobile telecommunications device screen, a further example of a challenge message such as may be implemented in accordance with the present invention.

Before turning the example to detailed discussion of the steps 48 implicated in validating the purported access right of the user requesting access to the secured resource, attention is directed to FIG. 18, which depicts one possible variation of the presentation of a challenge message 94. In particular, FIG. 18 shows one simple example of the many previously discussed possibilities for providing special instructions 93 in connection with the issuance of a challenge message 94. In the depicted case, the consumer is directed to respond to the challenge string 49 using only numbers from his or her private string. As will be appreciated by those of ordinary skill in the art, this instruction 93 will be particularly beneficial when it is known that the consumer will be forced to enter the response string through a limited input modality such as, for example, the simple keypad 95 depicted in FIG. 9, which of course will commonly be encountered at a POS, ATM or fueling station terminal device 73.

Turning the example now to detailed discussion of the steps 48 implicated in validating the purported access right of the user requesting access to the secured resource, it is first noted that an end user 34 of the present invention will necessarily formulate a response string corresponding to a challenge string 49 outside of the hardware and/or software provided as part of the authentication system 30 of the present invention. That said, the validation steps 48 begin with the consumer providing to the service client 33 for which access to a secured resource has been requested, as an authentication credential, his or her formulated response string. While the authentication credential (response string) may generally be provided to a service client 33 in any conceivable manner, including verbally, in writing, by electronic transmission or the like, at least some implementations may require that the end user 34 provide the response string in a particular manner. For example, as previously discussed, a self-service type transaction at a POS, ATM or fueling station terminal device 73 will generally dictate that the end user 34 provide the authentication credential through a service client provided input modality such as, for example, the limited keypad 95 depicted in FIG. 9.

In any case, for purposes of this continuing example, it shall be assumed that the consumer's private string is 2F46DAH525. As a result, the correct response string for the challenge string 49 of FIG. 17 would be 24FA63462B, which would be entered by the consumer through a service client provided input modality or otherwise provided to the service client 33. As previously discussed, however, the challenge string 49 of FIG. 18 is particularly adapted for use in a case where it is to be expected that the consumer will be forced to enter his or her response string through a service client provided input modality having limited functionality such as, for example, the numeric only keypad 95 depicted in FIG. 9. In this case, the correct response string for the challenge string 49 of FIG. 18 would be 2447636526, which, of course, may be readily entered by the consumer through a limited keypad 95. In any case, with the authentication credential provided, the fueling station, restaurant or on-line retailer submits the authentication credential to the service provider 36 along with the service client's identifying information 71 for validation and, assuming validation passes, access to the end user's authorized secured resource—in this case payment.

Once the authentication credential is received by the service provider 36, it is routed by the messaging gateway 60 or service user interface 61 to the authenticator 52 hosted on the service provider's application server 50. The authenticator 52 will then direct the validation tool 55 to evaluate the response string based upon the client identity and/or client reference for the response message. The validation tool 55 will access the transaction database 59 to retrieve the key string or key strings associated with the particular client identity and/or client reference and will evaluate the submitted response string against each (taking into account, if appropriate for the particular implementation, the passage of time) and will then report the result of the evaluation to the authenticator 52. If the evaluation fails, the process 48 will terminate and the failure will be reported by the request handler 51 to the service client 33. If, on the other hand, the evaluation passes the request handler 51 will determine whether a resource need be accessed on behalf of the fueling station, restaurant or on-line retailer.

If the request handler 51 determines that a resource should be accessed, a resource request is formulated using the transaction parameters stored in the transaction database 59 and any additional information as may be necessary that is stored in the user database 58. For example, in the case of processing a credit card transaction, the request handler 51 will retrieve the transaction amount from the transaction database 59 and will retrieve the full credit card number, expiration date, billing address, CV number or other necessary information pertaining to the credit card account from the resource attribute table 89 of the user database 58 and may also retrieve from the user attribute table 92 of the user database 58 necessary information concerning the fueling station, restaurant or on-line retailer such as, for example, banking information for deposit of obtained funds. In any case, the complete resource request is by the request handler 51 queued to a resource communication gateway and processed whereafter the result of the transaction is reported to the fueling station, restaurant or on-line retailer and also, preferably, to the consumer.

Figure 19:
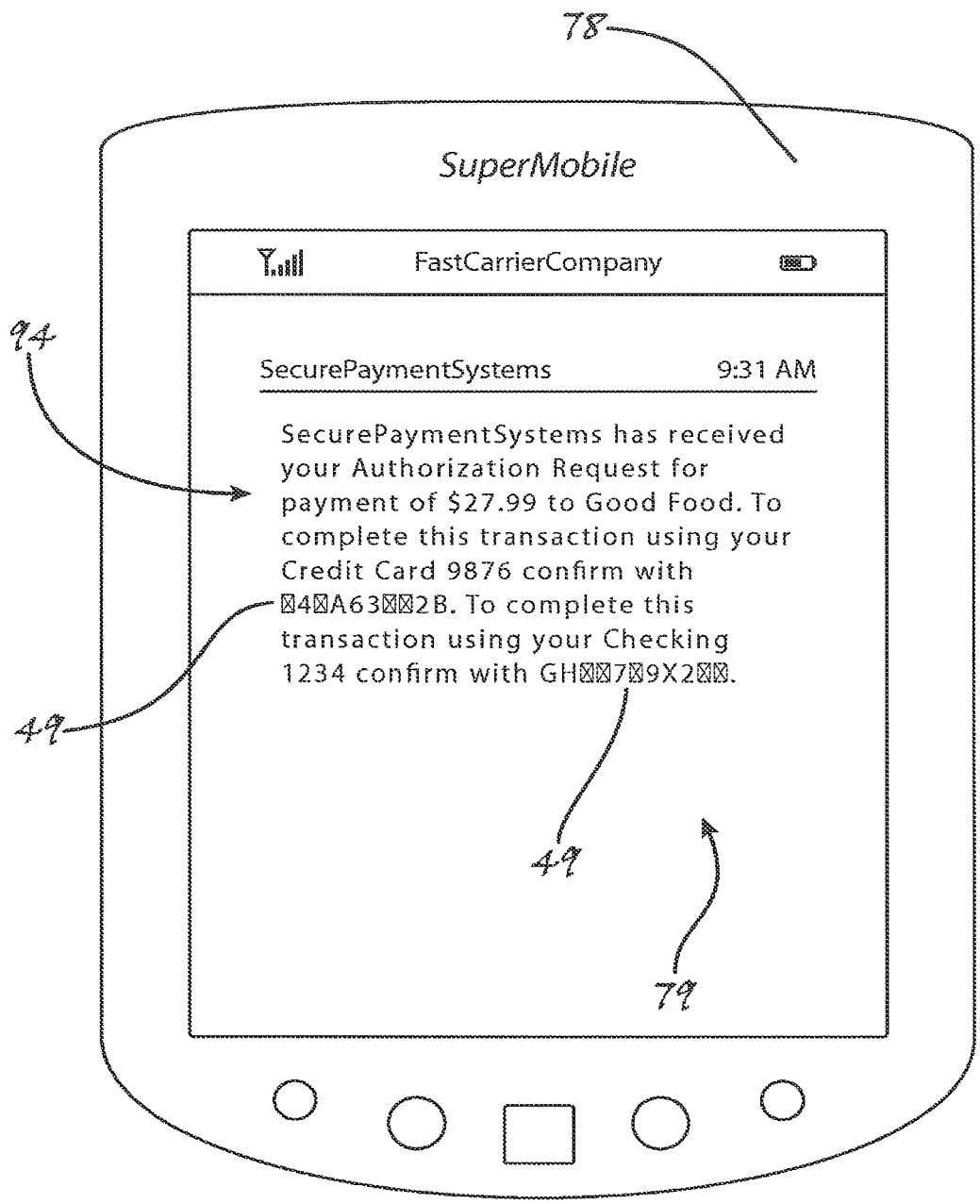
FIG. 19 shows, in a top plan representation of a mobile telecommunications device screen, a still further example of a challenge message such as may be implemented in accordance with the present invention showing, in particular, one exemplary means for determining a particular resource for access by an end user.

As previously mentioned, however, a third example means for determining a particular resource for access by the end user 34 may be implemented in connection with the issuing of a challenge message 94 to the consumer. In particular, as shown in FIG. 19, two or more challenge strings 49 may be presented in a challenge message 94 to an end user 34. As is apparent from the schema of FIG. 8, the preferred embodiment of the present invention contemplates generation of any number of key strings for any one transaction. Additionally, it should be noted that for each key string logged in the key string table 97 of the transaction database 59, there is in the same record associated one secured resource identified by RESOURCE_ID. In use, the resource will be identified based upon which of multiple possible correct response strings the consumer provides to the service client 33 for submission by the service client 33 for authentication by the service provider 36.

In a particularly efficient feature of the present invention, the service provider 36 may provide for the consumer an electronically generated receipt for the conducted transaction, which may be transmitted by e-mail or otherwise. In a case where the fueling station, restaurant, on-line retailer or other service client 33 provides itemized or otherwise detailed purchase data, such data may be included as part of the receipt. This, of course, completely relieves the service client 33 of having to generate a receipt. Additionally, combined transaction data may be assembled by the service provider 36 for periodic bulk reporting to the service client 33. Still further, the service provider 36 may, if desired, implement a budgeting service for the end user 34, wherein at the end user's behest financial transactions over budgeted limits or over budgeted limits for particular service clients 33 or types of service clients 33 will be deemed to fail validation in order to force compliance with the terms of a budget.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 34 that system, facility or the like for which the end user 34 desires access has implemented the teachings of the present invention. In any case, because the scope of the present invention is much broader than any particular embodiment, the foregoing detailed description should not be construed as a limitation of the scope of the present invention, which is limited only by the claims appended hereto.

I claim:

1. A method for authenticating the identity of a requester seeking access by a service client to a secured resource, said method comprising the steps of:
    receiving with at least one computer a request for access to a secured resource from a requester purporting to be an authorized user of said secured resource;
    generating a challenge string with said at least one computer, said challenge string being at least a partially random string having a plurality of symbols, wherein at least one of the symbols of the challenge string is a specially-designated symbol indicating the absence from said random string of a single randomly-selected symbol;
    communicating said challenge string to said authorized user;
    receiving a response string corresponding to said challenge string;
    evaluating said response string to authenticate the identity of said requester;
    wherein said at least one computer comprises at least one processor coupled to at least one processor-readable medium, said at least one processor-readable medium containing a request handler component and an authenticator component.

2. An authentication system for authenticating the identity of a requester seeking access by a service client to a secured resource, said authentication system comprising:
    a messaging gateway being a first set of instructions embodied in a computer-readable medium, said messaging gateway operable to receive a request for access to said secured resource;
    a computer in communication with said messaging gateway, said computer having a second set of instructions embodied in a computer-readable medium operable to generate a challenge string, said challenge string being an at least partially random string having a plurality of randomly-selected symbols and at least one specially-designated symbol intended to indicate the absence from said challenge string of a single randomly-selected symbol;
    wherein said first set of instructions is further operable to communicate said challenge string to said authorized user that said requester purports to be;
    wherein said second set of instructions is further operable to receive a response string corresponding to said challenge string; and
    wherein said second set of instructions is further operable to evaluate said response string to authenticate the identity of said requester.

3. The method of claim 1 wherein said request for access is received from said service client.

4. The method of claim 1 wherein said generating step comprises the steps of:
    selecting said plurality of randomly-selected symbols; and
    generating said challenge string contemporaneously with said selecting step.

5. The method of claim 1 wherein said response string is received from said service client.

6. The method of claim 1 wherein said response string comprises an authentication credential generated by said requestor and provided to said service client.

7. The method of claim 1 wherein said request for access is generated by and received from said requestor after receipt of request data by said requester from said service client.

8. The system of claim 2 further comprising a user interface in communication with said computer, said user interface being a third set of instructions embodied in a computer-readable medium operable to receive input from said requester.

9. The system of claim 2 wherein said second set of instructions if further operable to generate the challenge string contemporaneously with selection of said plurality of randomly-selected symbols.

* * * * *